US012659665B2

(12) United States Patent
Han et al.

(10) Patent No.: US 12,659,665 B2
(45) Date of Patent: Jun. 16, 2026

(54) FOLDABLE ELECTRONIC DEVICE INCLUDING A PLURALITY OF SPEAKERS AND METHOD OF OPERATING THE SAME

(71) Applicant: SAMSUNG ELECTRONICS CO., LTD., Suwon-si (KR)

(72) Inventors: Junhee Han, Suwon-si (KR); Youngjun An, Suwon-si (KR); Seonguk Park, Suwon-si (KR); Pilwon Seo, Suwon-si (KR); Seokwoo Lee, Suwon-si (KR); Jiyoung Lim, Suwon-si (KR); Jeongseob Kim, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 221 days.

(21) Appl. No.: 18/372,046

(22) Filed: Sep. 22, 2023

(65) Prior Publication Data

US 2024/0073605 A1 Feb. 29, 2024

Related U.S. Application Data

(63) Continuation of application No. PCT/KR2023/012372, filed on Aug. 22, 2023.

(30) Foreign Application Priority Data

Aug. 23, 2022 (KR) ........................ 10-2022-0105512
Sep. 8, 2022 (KR) ........................ 10-2022-0114308

(51) Int. Cl.
H04R 3/14 (2006.01)
H04M 1/02 (2006.01)
(Continued)

(52) U.S. Cl.
CPC ............ H04R 3/14 (2013.01); H04M 1/0216 (2013.01); H04M 1/0268 (2013.01);
(Continued)

(58) Field of Classification Search
CPC ... H04S 3/008; H04S 7/30; H04S 1/02; H04S 7/00; H04S 1/00; H04R 3/001;
(Continued)

(56) References Cited

U.S. PATENT DOCUMENTS 9,716,944 B2 7/2017 Yliaho et al.
9,864,567 B2 1/2018 Seo
(Continued)

FOREIGN PATENT DOCUMENTS

JP 4779526 B2 7/2011
JP 6025396 B2 10/2016
(Continued)

OTHER PUBLICATIONS

International Search Report with Written Opinion issued in International Application No. PCT/KR2023/012372; International Filing Date Aug. 22, 2023; Date of Mailing Nov. 27, 2023 (9 pages).

(Continued)

*Primary Examiner* — Yosef K Laekemariam
(74) *Attorney, Agent, or Firm* — CANTOR COLBURN LLP

(57) ABSTRACT

A foldable electronic device includes a first and second housings foldably coupled through a hinge, a flexible display supported by the first and second housings, a first speaker disposed in the first housing and a second speaker disposed in the second housing. The electronic device determines first and second states in which the first and second housings unfolded or folded. The electronic device controls sound frequency characteristics of the first and second speakers to have first sound frequency characteristics with the electronic device being in the first state. The electronic device controls sound frequency characteristics of the first speaker to have second sound frequency characteristics with the electronic device being in the second state. The elec- (Continued)

tronic device may also control sound frequency character-istics of the second speaker to have third sound output frequency characteristics with the electronic device being in the second state.

8 Claims, 21 Drawing Sheets

(51) Int. Cl.

| | | |
|---|---|---|
| H04R 1/02 | (2006.01) |
| H04R 1/26 | (2006.01) |
| H04R 5/02 | (2006.01) |
| H04S 1/00 | (2006.01) |
| H04S 7/00 | (2006.01) |

(52) U.S. Cl.
CPC .............. *H04R 1/028* (2013.01); *H04R 1/26* (2013.01); *H04R 5/02* (2013.01); *H04S 1/007* (2013.01); *H04S 7/307* (2013.01); *H04R 2499/11* (2013.01); *H04R 2499/15* (2013.01)

(58) Field of Classification Search
CPC ...... H04R 5/021; H04R 2420/07; H04R 3/14; H04R 1/26; H04R 1/02; H04M 1/02
See application file for complete search history.

(56) References Cited

U.S. PATENT DOCUMENTS

| | | | |
|---|---|---|---|
| 9,973,852 | B1 | 5/2018 | Hesketh et al. |
| 10,531,186 | B1* | 1/2020 | Litovsky ................ H04R 1/347 |
| 11,146,870 | B2 | 10/2021 | Chopra et al. |
| 2009/0087000 | A1 | 4/2009 | Ko |
| 2010/0008523 | A1 | 1/2010 | Demuynck et al. |
| 2014/0179380 | A1 | 6/2014 | Roh |
| 2014/0210740 | A1 | 7/2014 | Lee |
| 2014/0362513 | A1 | 12/2014 | Nurmi |
| 2015/0036864 | A1 | 2/2015 | Ozasa et al. |
| 2017/0052566 | A1 | 2/2017 | Ka et al. |
| 2018/0233172 | A1 | 8/2018 | Moon et al. |
| 2019/0245955 | A1* | 8/2019 | Lee ..................... H04M 1/0268 |
| 2020/0294533 | A1* | 9/2020 | Shen ..................... G06F 3/0487 |
| 2020/0396535 | A1* | 12/2020 | Zastoupil .............. G06F 3/0484 |
| 2020/0401187 | A1 | 12/2020 | Noh et al. |
| 2021/0058704 | A1 | 2/2021 | Tang et al. |
| 2022/0353361 | A1* | 11/2022 | Kim ................... H04M 1/0214 |
| 2022/0408170 | A1 | 12/2022 | Park et al. |
| 2023/0007387 | A1 | 1/2023 | Kim et al. |
| 2023/0057510 | A1 | 2/2023 | Park et al. |

FOREIGN PATENT DOCUMENTS

| | | |
|---|---|---|
| JP | 2023007487 A | 1/2023 |
| KR | 20090033717 A | 4/2009 |
| KR | 20140081445 A | 7/2014 |
| KR | 20140098384 A | 8/2014 |
| KR | 102089638 B1 | 3/2020 |
| KR | 20200132016 A | 11/2020 |
| KR | 20200139629 A | 12/2020 |
| KR | 20220079334 A | 6/2022 |
| KR | 20220154419 A | 11/2022 |
| KR | 20220168794 A | 12/2022 |
| KR | 20230026225 A | 2/2023 |

OTHER PUBLICATIONS

Extended European Search Report Issued In EP Application No. 23857685.4-1218; Mail Date Jul. 18, 2025; 8 Pages.

* cited by examiner

<FLAT STATE>

451

SECOND SPEAKER

450

420

430

410

FIRST SPEAKER

| STATE | SPEAKER | APPLIED TUNING VALUE | STEREO ALLOCATION | FREQUENCY BAND |
|---|---|---|---|---|
| FLAT STATE | FIRST SPEAKER | FIRST SPEAKER-FIRST TUNING VALUE | Left (FIRST PORTION) | ENTIRE FREQUENCY BAND |
| | SECOND SPEAKER | SECOND SPEAKER-FIRST TUNING VALUE | Left (FIRST PORTION) | ENTIRE FREQUENCY BAND |
| | THIRD SPEAKER | THIRD SPEAKER-FIRST TUNING VALUE | Right (SECOND PORTION) | ENTIRE FREQUENCY BAND |
| | FOURTH SPEAKER | FOURTH SPEAKER-FIRST TUNING VALUE | Right (SECOND PORTION) | ENTIRE FREQUENCY BAND |

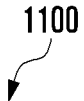

| STATE | SPEAKER | APPLIED TUNING VALUE | STEREO ALLOCATION | FREQUENCY BAND |
|---|---|---|---|---|
| FOLDED STATE | FIRST SPEAKER | FIRST SPEAKER-SECOND TUNING VALUE | Right (FIRST AREA) | HIGH-FREQUENCY BAND (FIRST PORTION) |
| | SECOND SPEAKER | SECOND SPEAKER-SECOND TUNING VALUE | Left (SECOND AREA) | HIGH-FREQUENCY BAND (FIRST PORTION) |
| | THIRD SPEAKER | THIRD SPEAKER-THIRD TUNING VALUE | Right (FIRST AREA) | MIDDLE/LOW-FREQUENCY BAND (SECOND PORTION) |
| | FOURTH SPEAKER | FOURTH SPEAKER-THIRD TUNING VALUE | Left (SECOND AREA) | MIDDLE/LOW-FREQUENCY BAND (SECOND PORTION) |

| SOUND LEVEL | OUTPUT(dB.) | APPLIED TUNING VALUE | |
| --- | --- | --- | --- |
| | | FLAT STATE | FOLDED STATE |
| 15 | 83 | FIRST TUNING VALUE | FIRST TUNING VALUE |
| 14 | 81 | FIRST TUNING VALUE | FIRST TUNING VALUE |
| 13 | 79 | FIRST TUNING VALUE | CHANGED TUNING VALUE |
| 12 | 78 | FIRST TUNING VALUE | CHANGED TUNING VALUE |
| 11 | 76 | FIRST TUNING VALUE | CHANGED TUNING VALUE |
| 10 | 74 | FIRST TUNING VALUE | CHANGED TUNING VALUE |
| 9 | 72 | FIRST TUNING VALUE | CHANGED TUNING VALUE |
| 8 | 70 | FIRST TUNING VALUE | CHANGED TUNING VALUE |
| 7 | 68 | FIRST TUNING VALUE | CHANGED TUNING VALUE |
| 6 | 62 | FIRST TUNING VALUE | CHANGED TUNING VALUE |
| 5 | 57 | FIRST TUNING VALUE | CHANGED TUNING VALUE |
| 4 | 51 | FIRST TUNING VALUE | CHANGED TUNING VALUE |
| 3 | 46 | FIRST TUNING VALUE | CHANGED TUNING VALUE |
| 2 | 40 | FIRST TUNING VALUE | CHANGED TUNING VALUE |
| 1 | 35 | FIRST TUNING VALUE | CHANGED TUNING VALUE |

1310 (brace grouping sound levels 15–14)

1320 (brace grouping sound levels 13–1)

FOLDABLE ELECTRONIC DEVICE INCLUDING A PLURALITY OF SPEAKERS AND METHOD OF OPERATING THE SAME

CROSS-REFERENCE TO RELATED APPLICATION(S

This application is a continuation application, claiming priority under § 365(c), of International Application No. PCT/KR2023/012372, filed on Aug. 22, 2023, which is based on and claims the benefit of Korean patent application number 10-2022-0114308 filed on Sep. 8, 2022, in the Korean Intellectual Property Office and of Korean patent application number 10-2022-0105512, filed on Aug. 23, 2022, in the Korean Intellectual Property Office, the disclosures of which are incorporated by reference herein in their entireties.

TECHNICAL FIELD

The disclosure relates to a foldable electronic device including multiple speakers, and a method for operating the same.

BACKGROUND ART

Functional differences between electronic devices from respective manufacturers have decreased substantially, and electronic devices thus have become slimmer in order to satisfy consumers' purchasing desires, and have been improved to enhance design aspects and to differentiate functional elements thereof. In line with development of display technologies, there have been active research and development regarding electronic devices having a flexible display (or rollable display). Electronic devices have evolved from unilateral rectangular shapes to more diversified shapes. For example, there has been development of flexible electronic devices having a flexible display applied thereto such that the flexible display can be folded, bent, rolled, or unfolded. Foldable electronic devices may have at least two housings foldably coupled such that the same can be easily carried, and a large-screen display is available when the same are used. Foldable electronic devices may include a hinge device (for example, hinge structure) configured to connect at least two housings, and multiple speakers disposed between at least two housings.

The above descriptions are provided only as background information for helping understanding of embodiments of the disclosure. No determination has been made regarding whether any of the above descriptions is applicable as the prior art in connection with the disclosure, and no claim has been made either.

DISCLOSURE

Technical Solution

Multiple speakers may be disposed inside a foldable electronic device, and spatial restrictions make it difficult to have flat frequency response characteristics in all audible frequency bands solely with characteristics of speakers themselves. Sound filters and tuning parameters may be used to tune frequency response characteristics of speakers, but the trade-off between high, middle, and low frequency bands makes it difficult to have flat frequency response characteristics in all audible frequency bands. Particularly, frequency response characteristics of speakers may deteriorate in low and high frequency bands. A foldable electronic device may have multiple speakers disposed in two housings, and output characteristics of the speakers need to be controlled according to the folding state (for example, folded state, flat state). In the folded state of the foldable electronic device, the first speaker disposed in the first housing and the second speaker disposed in the second housing come close to (for example, abut) each other. If the first and second speakers are disposed close to (for, example, abut) each other, sound waves that are output may counterbalance each other, thereby reducing the overall sound output. An embodiment of the disclosure may provide a foldable electronic device including multiple speakers and a method for operating the same, wherein sound output characteristics of the speakers are selectively controlled according to the folded state and flat state of the foldable electronic device, thereby ensuring flat frequency response characteristics in all audible frequency bands. Another embodiment of the disclosure may provide a foldable electronic device including multiple speakers and a method for operating the same, wherein the phase of sound waves output from the multiple speakers is selectively controlled according to the folded state and flat state of the foldable electronic device, thereby preventing the sound output from decreasing.

Technical problems to be solved by the disclosure are not limited to the above-mentioned technical problems, and other technical problems not mentioned herein will be clearly understood from the following description by those skilled in the art to which the disclosure pertains.

A foldable electronic device according to an embodiment of the disclosure may include a first housing, a second housing foldably coupled to the first housing through a hinge, a flexible display disposed to be supported by the first housing and the second housing, multiple speakers including a first speaker disposed in the first housing and a second speaker disposed in the second housing, a processor, and a memory operatively connected to the processor. The memory may include instructions. When the instructions are executed by the processor, the electronic device may determine a first state in which the first housing and the second housing are unfolded or a second state in which the first housing and the second housing are folded to face each other. When the instructions are executed by the processor, the electronic device may control sound output frequency characteristics of the first speaker and the second speaker so as to have first sound output frequency characteristics, based on that the electronic device is in the first state. When the instructions are executed by the processor, the electronic device may control sound output frequency characteristics of the first speaker so as to have second sound output frequency characteristics different from the first sound output frequency characteristics, based on that the electronic device is in the second state. When the instructions are executed by the processor, the electronic device may control sound output frequency characteristics of the second speaker so as to have third sound output frequency characteristics different from the second sound output frequency characteristics, based on that the electronic device is in the second state.

A foldable electronic device according to an embodiment of the disclosure may include a first housing, a second housing foldably coupled to the first housing through a hinge, a flexible display disposed to be supported by the first housing and the second housing, multiple speakers including a first speaker disposed in the first housing and a second speaker disposed in the second housing, a processor, and a memory operatively connected to the processor. The memory may include instructions. When the instructions are executed by the processor, the electronic device may determine a first state in which the first housing and the second housing are unfolded or a second state in which the first housing and the second housing are folded to face each other. When the instructions are executed by the processor, the electronic device may control sound output characteristics of the multiple speakers such that sounds are output from the multiple speakers without a phase change, based on that the electronic device is in the first state. When the instructions are executed by the processor, the electronic device may control sound output characteristics of the multiple speakers such that the phase of sounds output from at least one speaker among the multiple speakers is changed, based on that the electronic device is in the second state A foldable electronic device according to an embodiment of the disclosure may include a first housing, a second housing foldably coupled to the first housing through a hinge, a flexible display disposed to be supported by the first housing and the second housing, multiple speakers including a first speaker disposed in the first housing and a second speaker disposed in the second housing, a processor, and a memory operatively connected to the processor. The memory may include instructions. When the instructions are executed by the processor, the electronic device may determine a first state in which the first housing and the second housing are unfolded or a second state in which the first housing and the second housing are folded to face each other. When the instructions are executed by the processor, the electronic device may control sound output frequency characteristics applied to the multiple speakers so as to have substantially flat frequency output characteristics in an entire frequency band which the multiple speakers can output, regardless of whether the first state or the second state of the electronic device.

A foldable electronic device including multiple speakers and a method for operating the same, according to an embodiment of the disclosure, may selectively control sound output characteristics of the multiple speakers according to the folded state and flat state of the foldable electronic device, thereby ensuring flat frequency response characteristics in all audible frequency bands.

A foldable electronic device including multiple speakers and a method for operating the same, according to an embodiment of the disclosure, may selectively control the phase of sound waves output from the multiple speakers according to the folded state and flat state of the foldable electronic device, thereby preventing the sound output from decreasing.

A foldable electronic device including multiple speakers and a method for operating the same, according to an embodiment of the disclosure, may selectively apply a first tuning value and a second tuning value to multiple speakers according to the folding state (for example, folded state, flat state) of the foldable electronic device, thereby ensuring flat frequency response characteristics in all audible frequency bands (low, middle, and high frequency bands).

A foldable electronic device including multiple speakers and a method for operating the same, according to an embodiment of the disclosure, may output sounds at the maximum output of the multiple speakers regardless of the first state (for example, flat state) and the second state (for example, folded state) of the foldable electronic device.

A foldable electronic device and a method for operating the same, according to an embodiment of the disclosure, may selectively control the phase of sound waves output from the multiple speakers according to the first state (for example, flat state) and the second state (for example, folded state) of the foldable electronic device, thereby preventing the sound output from decreasing.

Advantageous effects obtainable from the disclosure are not limited to the above-mentioned advantageous effects, and other advantageous effects not mentioned herein will be clearly understood by those skilled in the art to which the disclosure pertains.

DESCRIPTION OF DRAWINGS

In connection with description of drawings, identical or similar components may be given similar or identical reference numerals.

FIG. 1 is a block diagram of an electronic device inside a network environment according to various embodiments of the disclosure.

FIG. 3A illustrates a first state (for example, flat state, open state) of an electronic device according to various embodiments of the disclosure.

FIG. 4 illustrates sound waves output from multiple speakers in a first state (for example, flat state) of a foldable electronic device.

FIG. 10 illustrates controlling frequency response characteristics and stereo output of speakers in a first state (for example, flat state) of a foldable electronic device according to an embodiment of the disclosure.

FIG. 11 illustrates controlling frequency response characteristics and stereo output of speakers in a second state (for example, folded state) of a foldable electronic device according to an embodiment of the disclosure.

FIG. 13 illustrates applying tuning values of multiple speakers in order to control the entire sound output according to a first state (for example, flat state) or a second state (for example, folded state) of a foldable electronic device according to an embodiment of the disclosure.

FIG. 15 illustrates sound waves output from multiple speakers in a second state (for example, folded state) of a foldable electronic device according to an embodiment of the disclosure.

FIG. 18 illustrates a multi-foldable electronic device according to an embodiment of the disclosure.

It is to be noted that, throughout all drawings, identical reference numerals are used to describe identical or similar elements, features, and structures.

MODE FOR INVENTION

Figure 2:
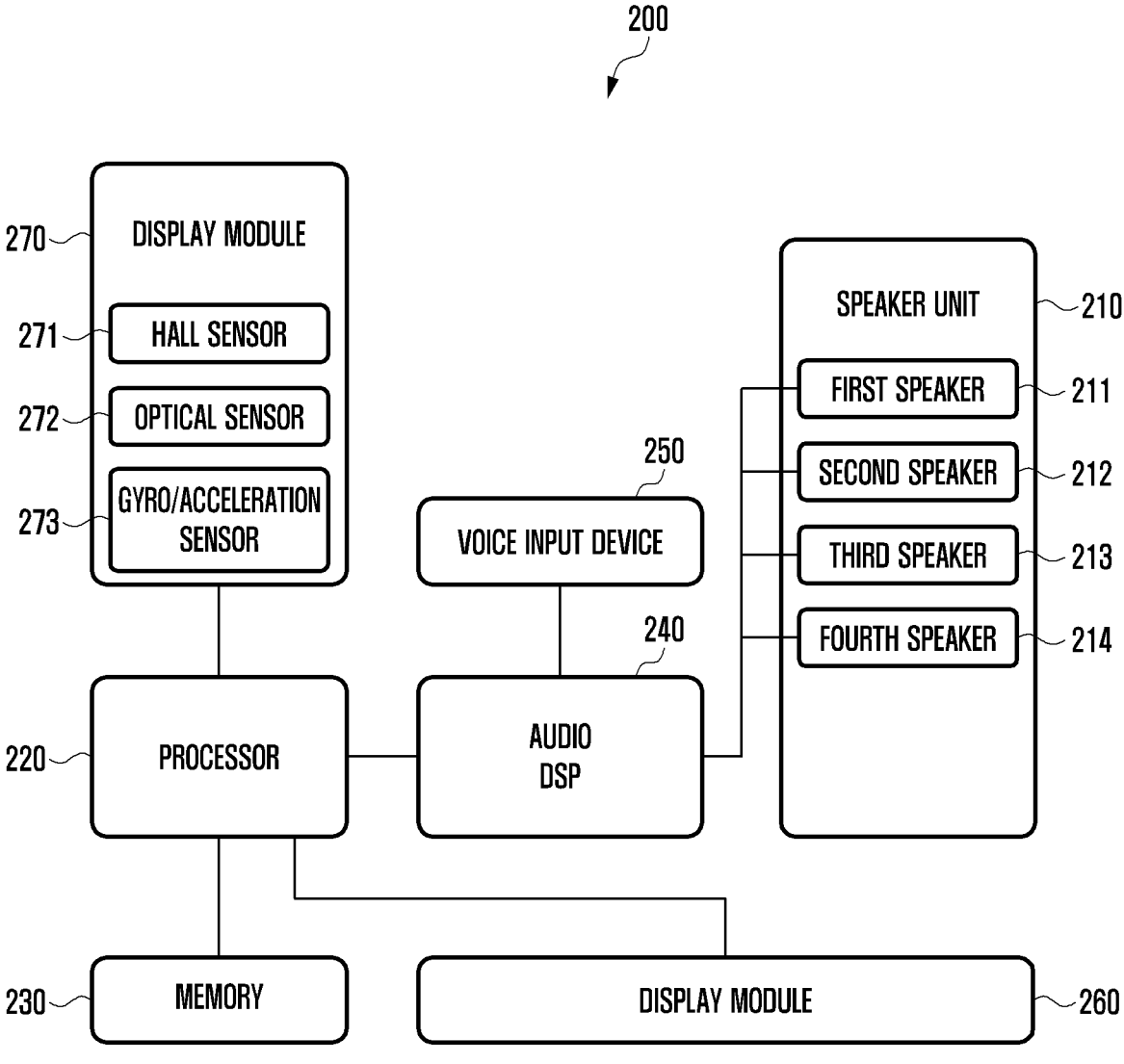
FIG. 2 is a block diagram of an electronic device according to an embodiment of the disclosure.

The following description with reference to the accompanying drawings is provided to help overall understanding of various embodiments of the disclosure as defined by the claims and equivalents thereof. Although various specific details are included herein to help understanding, such details are to be considered as examples only. Therefore, a person skilled in the art will recognize that various changes and modifications can be made to various embodiments disclosed herein without deviating from the scope and idea of the disclosure. In addition, descriptions of know functions and configurations may be omitted for clarity and conciseness.

Terms and words used in the following description and claims are not limited to textual meanings, and are merely used by applicants to enable clear and consistent understanding of the disclosure. Therefore, it is to be obvious to a person skilled in the art that the following description of various embodiments of the disclosure are provided for the purpose of examples only without limiting the disclosure as defined by the accompanying claims and equivalents thereof.

A singular form is to be understood as including multiple objects indicated thereby, unless explicitly mentioned otherwise. Therefore, mention of "a component surface", for example, may include mention of one or more of such surfaces.

Figure 1:
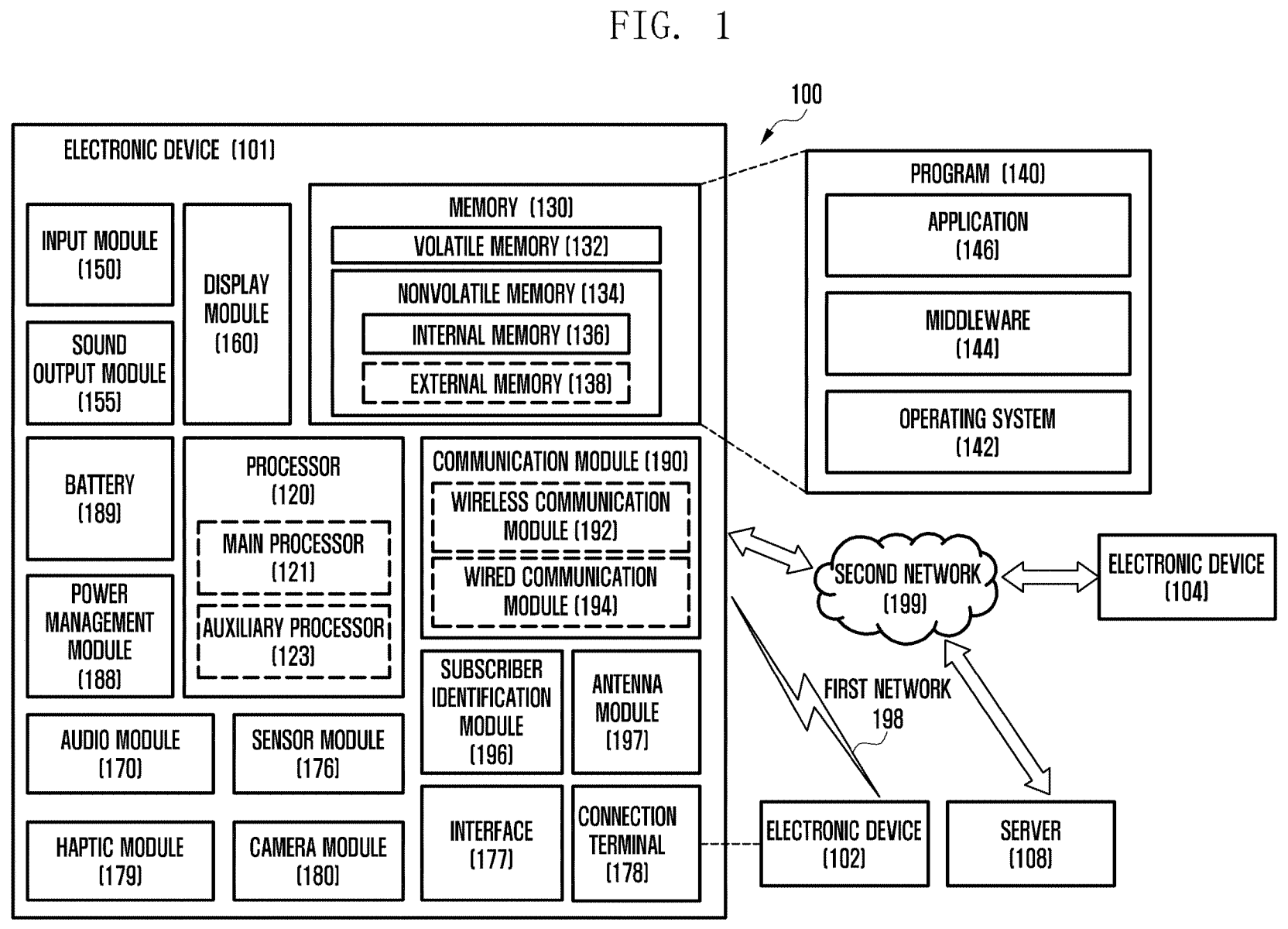

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic,"

"logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to an embodiment, the display module 160 illustrated in FIG. 1 may include a flexible display configured such that a screen (for example, display surface) can be folded or unfolded.

According to an embodiment, the display module 160 illustrated in FIG. 1 may include a flexible display disposed to be able to slide, thereby providing a screen (for example, display surface).

According to an embodiment, the display module 160 illustrated in FIG. 1 is described as including a foldable display or a flexible display, but is not limited thereto. The display module 160 may include a bar-type or plate-type display.

FIG. 2 is a block diagram of an electronic device according to an embodiment of the disclosure.

Referring to FIG. 2, the electronic device 200 according to an embodiment of the disclosure (for example, electronic device 101 in FIG. 1, electronic device 300 in FIG. 3A and FIG. 3B, electronic device 400 in FIG. 4 and FIG. 5, electronic device 700 in FIG. 7 and FIG. 8) may include a speaker unit 210 (for example, sound output module 155 in FIG. 1), a processor 220 (for example, processor 120 in FIG. 1), a memory 230 (for example, memory 130 in FIG. 1), an audio digital signal processor (DSP) 240 (for example, audio module 170 in FIG. 1), a voice input device 250 (for example, input module 150 in FIG. 1), a display module 260 (for example, display module 160 in FIG. 1), and a sensor module 270 (for example, sensor module 176 in FIG. 1).

In an embodiment, the speaker unit 210 may include multiple speakers 211, 212, 213, 214. For example, among the multiple speakers 211, 212, 213, 214, the first speaker 211 (for example, first speaker 740 in FIG. 7) and the second speaker 212 (for example, second speaker 750 in FIG. 7) may be disposed in a first housing (for example, first housing structure 311 in FIG. 3A and FIG. 3B). For example, among the multiple speakers 211, 212, 213, 214, the third speaker 213 (for example, third speaker 760 in FIG. 7) and the fourth speaker 214 (for example, fourth speaker 770 in FIG. 7) may be disposed in a second housing (for example, second housing structure 312 in FIG. 3A and FIG. 3B).

Figure 3A:
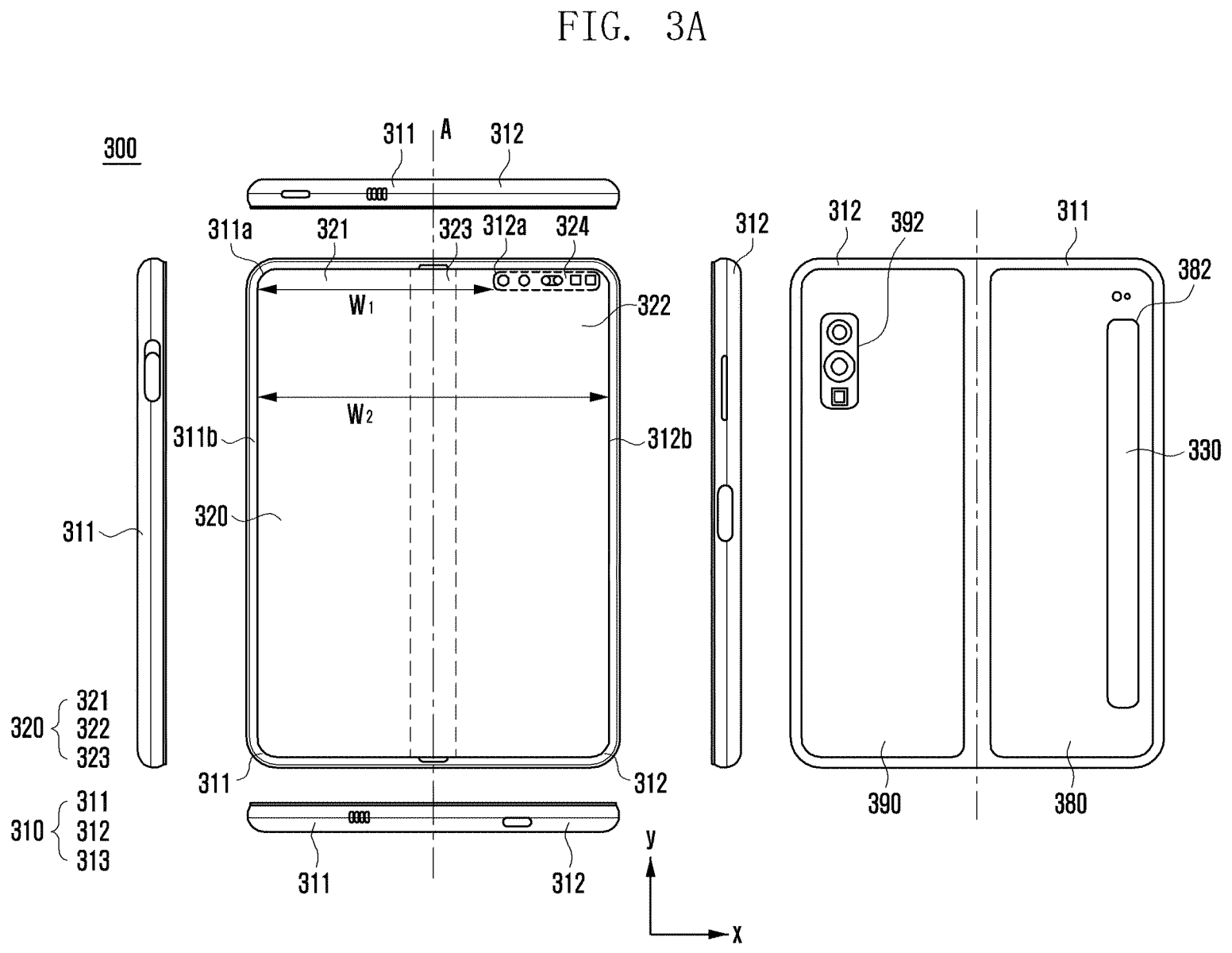
Figure 3B:
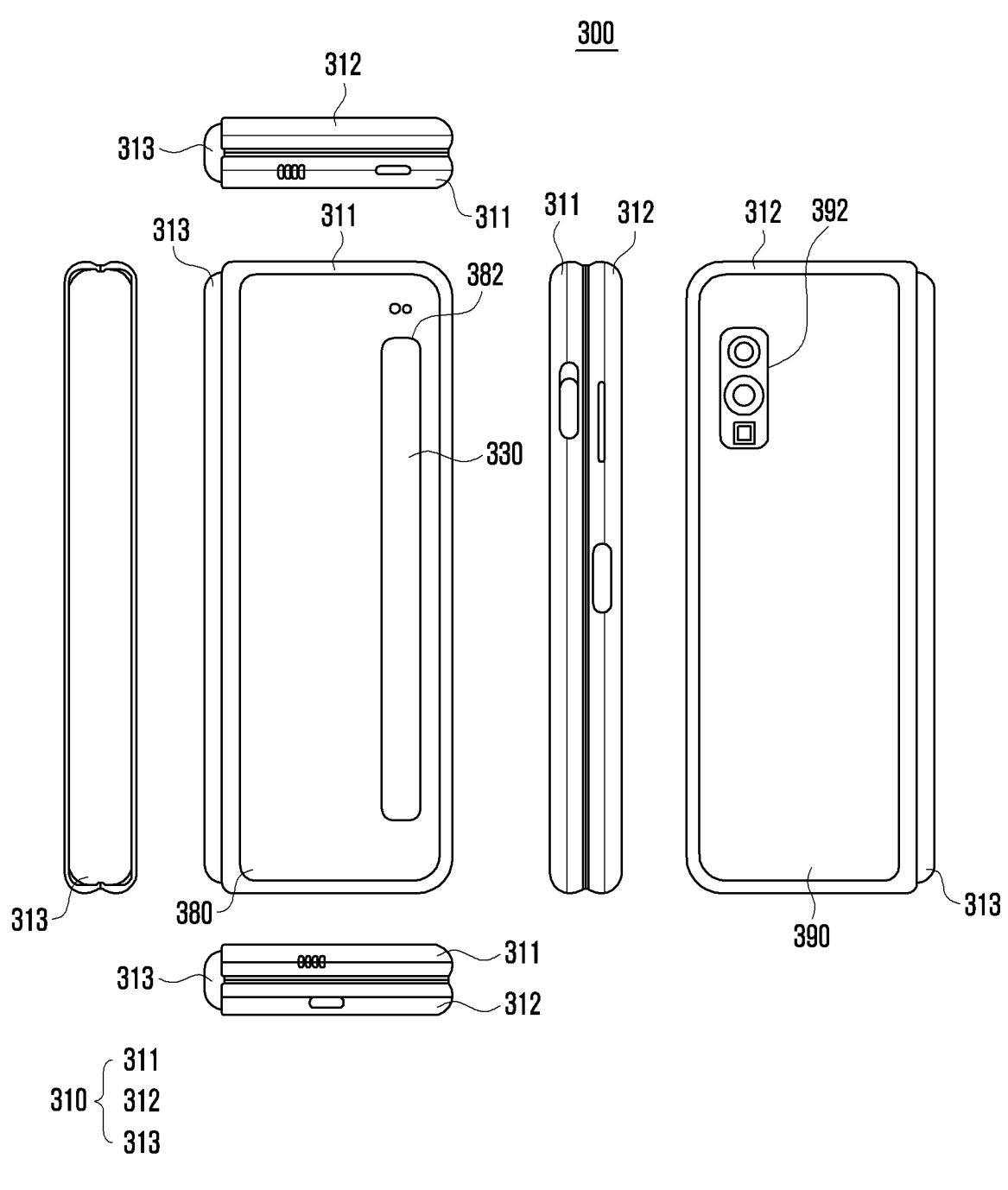
FIG. 3B illustrates a second state (for example, folded state, closed state) of an electronic device according to various embodiments of the disclosure.
Figure 4:
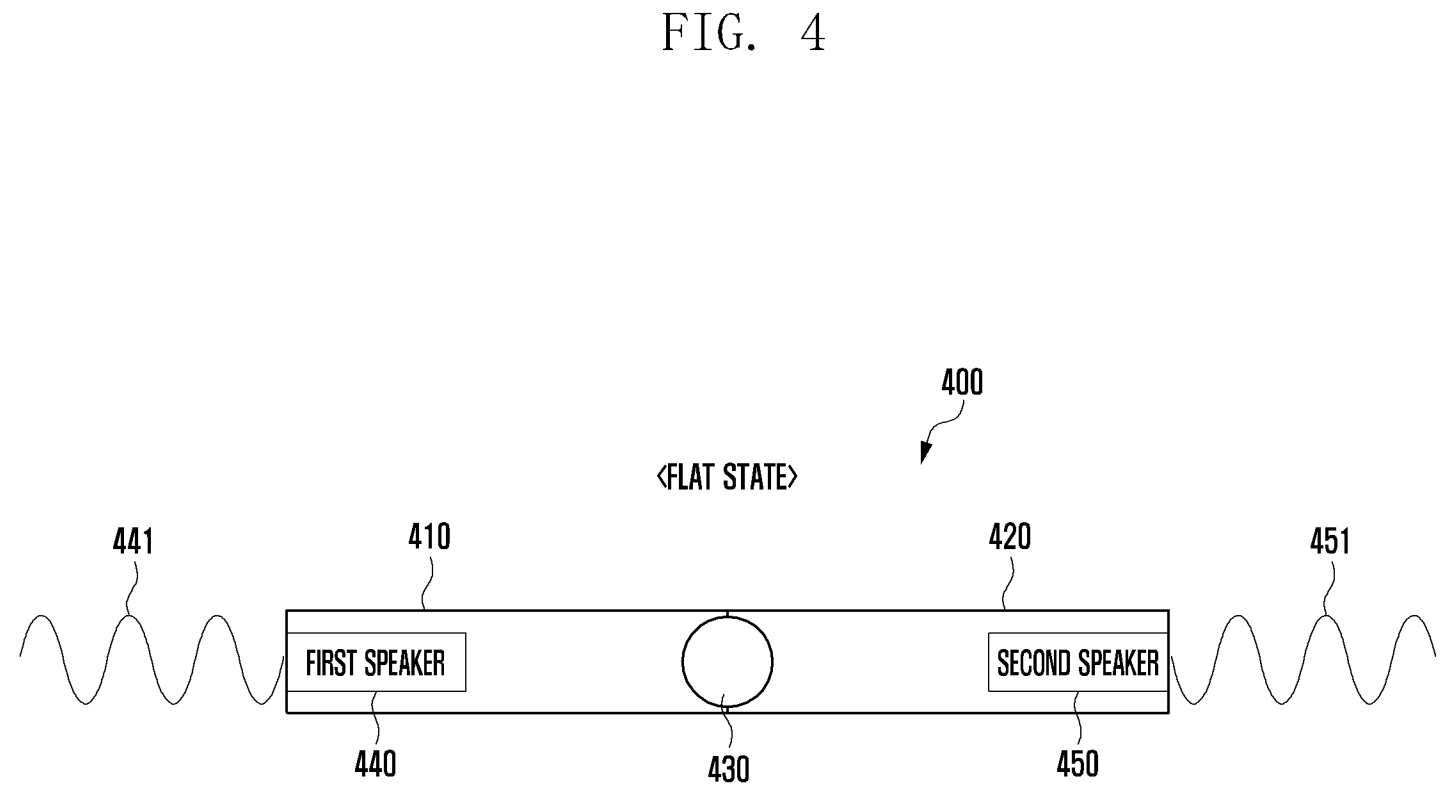
Figure 5:
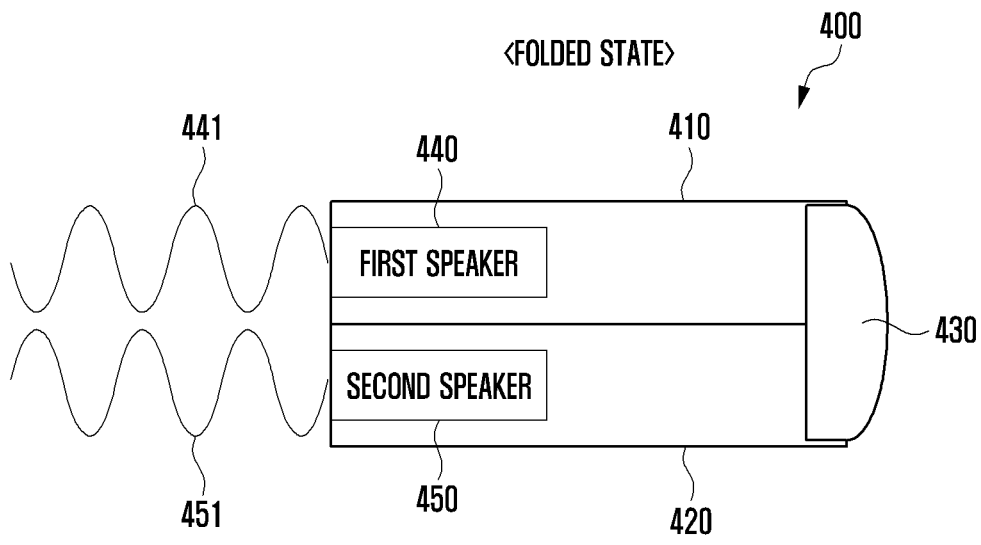
FIG. 5 illustrates sound waves output from multiple speakers in a second state (for example, folded state) of a foldable electronic device.
Figure 7:
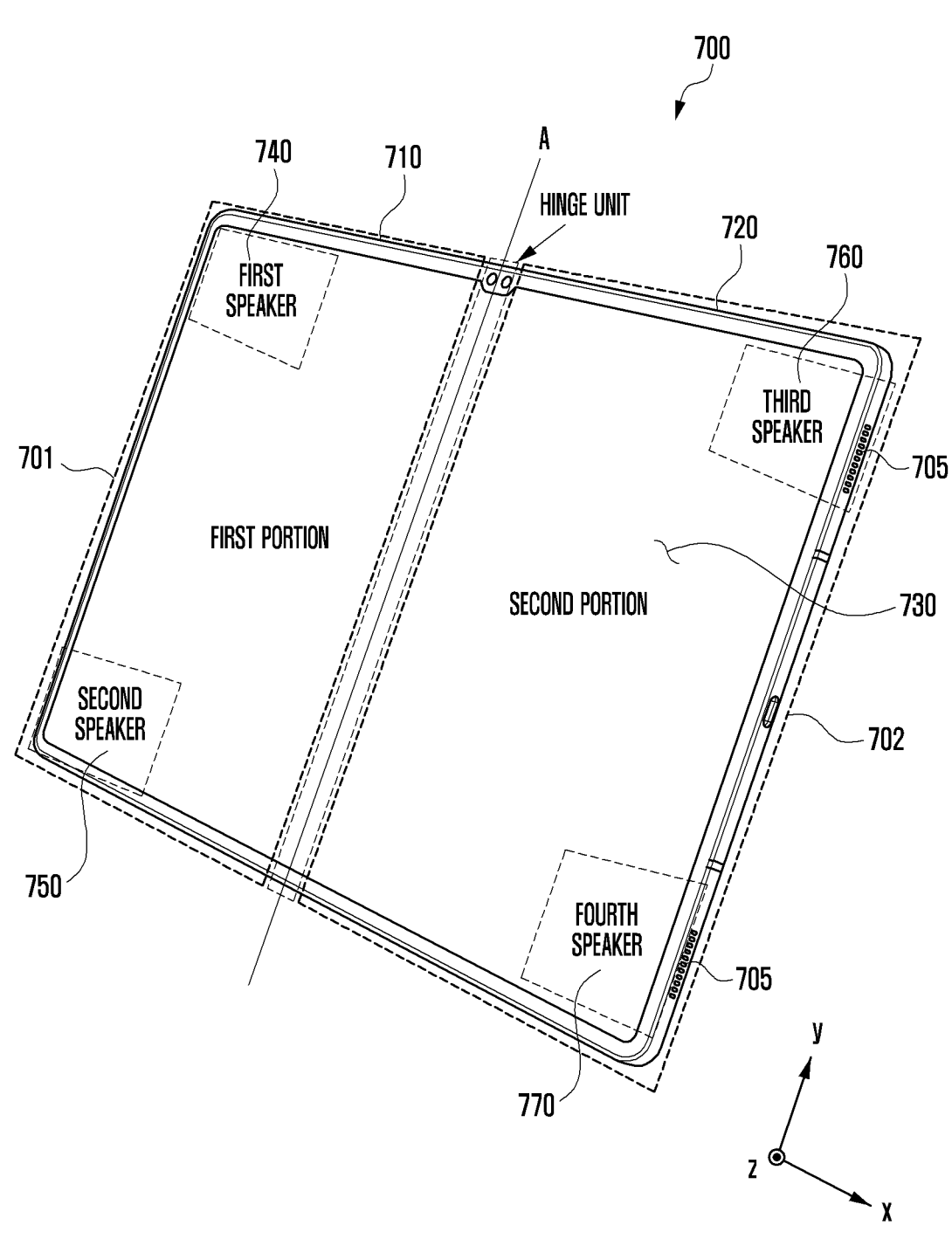
FIG. 7 illustrates a foldable electronic device according to an embodiment of the disclosure, which has four speakers disposed thereon, and which is divided into a first portion and a second portion in order to control frequency response characteristics of the speakers.
Figure 8:
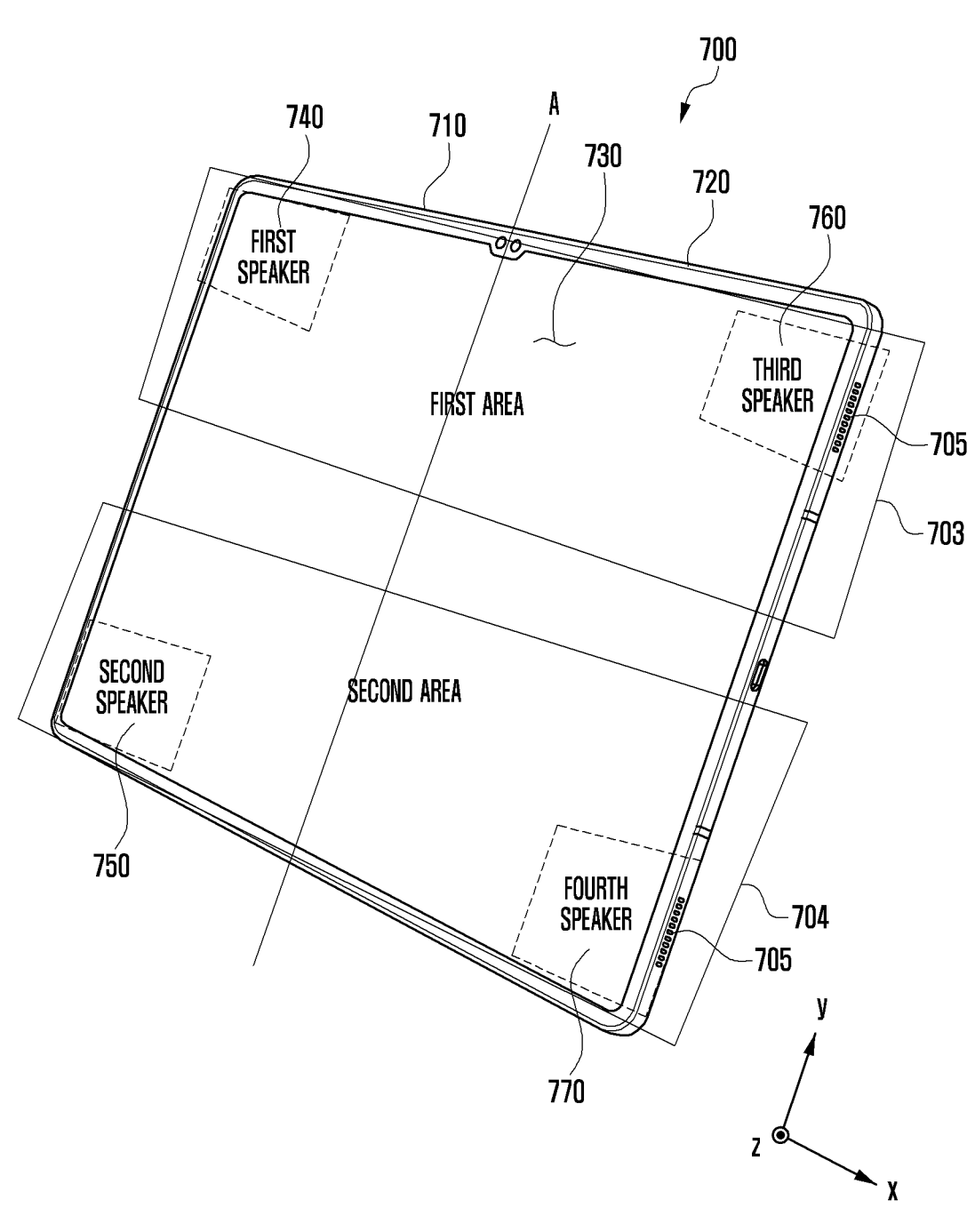
FIG. 8 illustrates a foldable electronic device according to an embodiment of the disclosure, which has four speakers disposed thereon, and which is divided into a first area and a second area in order to control stereo left and right outputs.

For example, the frequency response characteristics and stereo output of the multiple speakers 211, 212, 213, 214 may be controlled according to a first state (for example, flat state) or second state (for example, folded state) of the electronic device 200 (for example, electronic device 300 in FIG. 3A and FIG. 3B, electronic device 400 in FIG. 4 and FIG. 5, electronic device 700 in FIG. 7 and FIG. 8).

For example, the phase of sound waves output from the multiple speakers 211, 212, 213, 214 may be controlled according to the first state (for example, flat state) or second state (for example, folded state) of the electronic device 200 (for example, electronic device 300 in FIG. 3A and FIG. 3B, electronic device 400 in FIG. 4 and FIG. 5, electronic device 700 in FIG. 7 and FIG. 8).

In an embodiment, the processor 220 may determine a first state (for example, flat state) or second state (for example, folded state) of the electronic device 200 (for example, electronic device 300 in FIG. 3A and FIG. 3B, electronic device 400 in FIG. 4 and FIG. 5, electronic device 700 in FIG. 7 and FIG. 8). For example, the processor 220 may control the audio DSP 240 such that the frequency response characteristics and stereo output of the multiple speakers 211, 212, 213, 214 are controlled according to the first state (for example, flat state) or second state (for example, folded state) of the electronic device 200, 300, 400, 700.

For example, the processor 220 may control the audio DSP 240 such that the phase of sound waves output from the multiple speakers 211, 212, 213, 214 are controlled according to the first state (for example, flat state) or second state (for example, folded state) of the electronic device 200, 300, 400, 700.

In an embodiment, the memory 230 may be operatively connected to the processor 220. For example, the memory 230 may store instructions for controlling the frequency response characteristics and stereo output of the multiple speakers 211, 212, 213, 214 according to the first state (for example, flat state) or second state (for example, folded state) of the electronic device 200, 300, 400, 700.

For example, the memory 230 may store instructions for controlling the phase of sound waves output from the multiple speakers 211, 212, 213, 214 according to the first state (for example, flat state) or second state (for example, folded state) of the electronic device 200, 300, 400, 700.

For example, the memory 230 may store various pieces of data used for the processor 220, the audio DSP 240, and the sensor module 270 of the electronic device 200, 300, 400, 700. Data stored in the memory 230 may include, for example, software (for example, program 140 in FIG. 1) and input data or output data regarding a command related thereto. The memory 230 may include a volatile memory (for example, volatile memory 132 in FIG. 1) or a nonvolatile memory (for example, nonvolatile memory 134 in FIG. 1).

In an embodiment, the audio DSP 240 may change sample ratios with regard to one or more digital audio signals, apply one or more filters, process interpolation, amplify or attenuate all or some frequency bands, process noise (for example, attenuate noise or echo), change channels (for example, switch between mono and stereo), conduct mixing, or extract a designated signal. According to an embodiment, one or more functions of the audio signal processor 240 may be implemented as equalizers.

In an embodiment, the audio DSP 240 may control at least one of the frequency response characteristics of the multiple speakers 211, 212, 213, 214, the stereo output thereof, and the phase of sound waves that are output, according to the first state (for example, flat state) or second state (for example, folded state) of the electronic device 200, 300, 400, 700, based on control of the processor 220, while sound waves are output through the multiple speakers 211, 212, 213, 214.

For example, the audio DSP 240 may control the frequency response characteristics and stereo output of the multiple speakers 211, 212, 213, 214 according to the first state (for example, flat state) or second state (for example, folded state) of the electronic device 200, 300, 400, 700, based on control of the processor 220.

For example, the audio DSP 240 may control the phase of sound waves output from the multiple speakers 211, 212, 213, 214 according to the first state (for example, flat state) or second state (for example, folded state) of the electronic device 200, 300, 400, 700, based on control of the processor 220.

Although the processor 220 and the audio DSP 240 are illustrated as separate components in FIG. 2, some or all functions of the audio DSP 240 may be incorporated by the processor 220. Some or all functions of the audio DSP 240 may be implemented as hardware or software.

In an embodiment, the voice input device 250 may include at least one microphone. For example, when the voice input device 250 includes a single microphone, the single microphone may be disposed in the first housing (for example, first housing structure 311 in FIG. 3A and FIG. 3B) or the second housing (for example, second housing structure 312 in FIG. 3A and FIG. 3B). For example, when the voice input device 250 includes multiple microphones, the first microphone may be disposed in the first housing (for example, first housing structure 311 in FIG. 3A and FIG. 3B), and the second microphone may be disposed in the second housing (for example, second housing structure 312 in FIG. 3A and FIG. 3B).

In an embodiment, the display module 260 may be disposed in a space formed by the housing (for example, housing 310 in FIG. 3A and FIG. 3B) of the electronic device 200, 300, 400, 700. The display module 260 may include a flexible display or a foldable display.

In an embodiment, the sensor module 270 may include multiple sensors 271, 272, 273. For example, the sensor module 270 may include a Hall sensor 271, an optical sensor 272, and a gyro/acceleration sensor 273.

For example, the sensor module 270 may sense the operating state (for example, flat state, folded state, intermediate state) of the electronic device 200, 300, 400, 700. The sensor module 270 may generate an electric signal or a data value corresponding to the sensed state and may provide the same to the processor 220. The sensor module 270 may include not only a Hall sensor 271, an optical sensor 272, and a gyro/acceleration sensor 273, but also a gesture sensor, an atmospheric pressure sensor, a magnetic sensor, a grip sensor, a proximity sensor, a color sensor, an infrared (IR) sensor, a biometric sensor, a temperature sensor, a humidity sensor, or an illuminance sensor.

For example, the processor 220 may determine, based on sensing data input from the sensor module 270, whether the electronic device 200, 300, 400, 700 is in a first state (for example, flat state) or in a second state (for example, folded state).

For example, the processor 220 may determine, based on sensing data input from the sensor module 270, whether the electronic device 200, 300, 400, 700 is in a third state (for example, intermediate state between unfolded and folded states).

For example, the processor 220 may determine, based on sensing data input from the sensor module 270, whether the electronic device 200, 300, 400, 700 is transitioning from the first state (for example, flat state) to the second state (for example, folded state).

For example, the processor 220 may determine, based on sensing data input from the sensor module 270, whether the electronic device 200, 300, 400, 700 is transitioning from the second state (for example, folded state) to the first state (for example, flat state).

FIG. 3A illustrates a first state (for example, flat state, open state) of an electronic device according to various embodiments of the disclosure. FIG. 3B illustrates a second state (for example, folded state, closed state) of an electronic device according to various embodiments of the disclosure.

Referring to FIG. 3A and FIG. 3B, the electronic device 300 (for example, electronic device 101 in FIG. 1, electronic device 200 in FIG. 2, electronic device 400 in FIG. 4 and FIG. 5, electronic device 700 in FIG. 7 and FIG. 8) may include a housing 310 and a display 320 (for example, display module 160 in FIG. 1, display 730 in FIG. 7 and FIG. 8) disposed in a space formed by the housing 310. In an embodiment, the display 320 may include a flexible display or foldable display.

According to an embodiment, the surface on which the display 320 is disposed may be defined as the first surface or front surface of the electronic device 300 (for example, a surface on which a screen is displayed when unfolded). The opposite surface of the front surface may be defined as the second surface or rear surface of the electronic device 300.

A surface surrounding the space between the front and rear surfaces may be defined as the third surface or side surface of the electronic device 300. For example, the electronic device 300 may have a folding area 323 folded or unfolded in a first direction (for example, x-axis direction) with reference to a folding axis (for example, A-axis).

In an embodiment, the housing 310 may include a first housing structure 311, a second housing structure 312 including a sensor area 324, a first rear cover 380, and/or a second rear cover 390. The type and coupling of the housing 310 of the electronic device 300 is not limited to those illustrated in FIG. 3A and FIG. 3B, and may be implemented by a combination and/or coupling of other shapes or components. In an embodiment, the first housing structure 311 and the first rear cover 380 may be formed integrally, and the second housing structure 312 and the second rear cover 390 may be formed integrally.

In an embodiment, the first housing structure 311 and the second housing structure 312 may be disposed on both sides of the folding axis A, and may be shaped to be symmetrical with regard to the folding axis A as a whole. The angle between the first housing structure 311 and the second housing structure 312 may vary according to whether the electronic device 300 is in a first state (for example, flat state), in a second state (for example, folded state), or in a third state (for example, intermediate state between unfolded and folded states).

In an embodiment, the second housing structure 312 may further include the sensor area 324 in which various sensors (for example, illuminance sensor, iris sensor, and/or image sensor) are disclosed, unlike the first housing structure 311, but may be shaped to be symmetrical therewith in other areas. As another example, the sensor area 324 may be disposed in the first housing structure 311 or omitted.

In an embodiment, at least one sensor (for example, camera module, illuminance sensor, iris sensor, and/or image sensor) may be disposed below the display and/or in a bezel area, in addition to the sensor area 324.

In an embodiment, the first housing structure 311 and the second housing structure 312 may form a recess in which the display 320 is contained. In the illustrated embodiment, due to the sensor area 324, the recess may have two or more different widths in a direction perpendicular to the folding axis A (for example, x-axis direction).

For example, the recess may have a first width W1 between the first portion 311a of the first housing structure 311 and the first portion 312a of the second housing structure 312 formed on a periphery of the sensor area 324 among the second housing structure 312. The recess may have a second width W2 formed by the second portion 311b of the first housing structure 311, which is substantially parallel to the folding axis A among the first housing structure 311, and by the second portion 312b of the second housing structure 312, which does not correspond to the sensor area 324, and which is substantially parallel to the folding axis A, among the second housing structure 312. In this case, the second width W2 may be formed longer than the first width W1. In other words, the first portion 311a of the first housing structure 311 and the first portion 312a of the second housing structure 312, which have shapes asymmetrical with each other, may form the first width W1 of the recess. The second portion 311b of the first housing structure 311 and the second portion 31ba of the second housing structure 312, which have shapes symmetrical with each other, may form the second width W2 of the recess.

In an embodiment, the first portion 312a and the second portion 312b of the second housing structure 312 may have different distances from the folding axis A. The width of the recess is not limited to the illustrated example. In various embodiments, the recess may have multiple widths by means of the type of the sensor area 324 or asymmetrically shaped portions of the first housing structure 311 and the second housing structure 312.

In an embodiment, the first housing structure 311 and the second housing structure 312 may have at least a part made of a metal or nonmetal material having a selected magnitude of rigidity to support the display 320.

In an embodiment, the sensor area 324 may be formed to have a predetermined area adjacent to a corner of the second housing structure 312. However, the disposition, shape, and size of the sensor area 324 is not limited to the illustrated example. For example, the sensor area 324 may be provided on another corner of the second housing structure 312 or in an area between the top and bottom corners thereof.

In an embodiment, components for performing various functions embedded in the electronic device 300 may be exposed to the front surface of the electronic device 300 through the sensor area 324 or one or openings provided in the sensor area 324. In various embodiments, the components may include various kinds of sensors. The sensors may include, for example, at least one of an illuminance sensor, a front camera (for example, camera module), a receiver, or a proximity sensor.

In an embodiment, the first rear cover 380 may be disposed on one side of the folding axis A on the rear surface of the electronic device 300, may have a substantially rectangular periphery, for example, and the periphery may be surrounded by the first housing structure 311. As another example, the second rear cover 390 may be disposed on the other side of the folding axis A on the rear surface of the electronic device, and may have a periphery surrounded by the second housing structure 312.

In an embodiment, the first rear cover 380 and the second rear cover 390 may have substantially symmetrical shapes around the folding axis A. However, the first rear cover 380 and the second rear cover 390 do not necessarily have symmetrical shapes and, in another embodiment, the electronic device 300 may include a first rear cover 380 and a second rear cover 390 in various shapes. In another embodiment, the first rear cover 380 may be formed integrally with the first housing structure 311, and the second rear cover 390 may be formed integrally with the second housing structure 312.

In an embodiment, the first rear cover 380, the second rear cover 390, the first housing structure 311, and the second housing structure 312 may form a space in which various components (for example, printed circuit board or battery) of the electronic device 300 may be disposed. In an embodiment, one or more components of the electronic device 300 may be disposed or visually exposed on the rear surface of the electronic device 300. For example, at least a part of a sub display 330 may be visually exposed through a first rear area 382 of the first rear cover 380. In an embodiment, one or more components or sensors or may be visually exposed through a second rear area 392 of the second rear cover 390. In various embodiments, the sensors may include an illuminance sensor, a proximity sensor, and/or a rear camera.

In an embodiment, a hinge cover 313 may be disposed between the first housing structure 311 and the second housing structure 312 and configured to cover an internal component (for example, hinge structure). The hinge cover 313 may cover abutting parts of the first housing structure 311 and the second housing structure 312 by means of unfolding and folding of the electronic device 300.

In an embodiment, the hinge cover 313 may be covered by parts of the first housing structure 311 and the second housing structure 312 or exposed to the outside, according to the first state (for example, flat state) or second state (for example, folded state) of the electronic device 300. In an embodiment, when the electronic device 300 is in the first state (for example, flat state), the hinge cover 313 may be covered by the first housing structure 311 and the second housing structure 312 and thus not exposed.

In an embodiment, when the electronic device 300 is in the second state (for example, folded state) (for example, fully folded state), the hinge cover 313 may be exposed to the outside between the first housing structure 311 and the second housing structure 312. In an embodiment, in a third state (for example, intermediate state) in which the first housing structure 311 and the second housing structure 312 are folded with a certain angle, the hinge cover 313 may be partially exposed to the outside between the first housing structure 311 and the second housing structure 312. However, the exposed area in this case may be smaller than that in the fully folded state. In an embodiment, the hinge cover 313 may include a curved surface.

In an embodiment, the display 320 may be disposed in a space formed by the housing 310. For example, the display 320 may be seated in a recess formed by the housing 310, and may form the majority of the front surface of the electronic device 300.

In an embodiment, the front surface of the electronic device 300 may include a display 320 and a partial area of the first housing structure 311 and a partial area of the second housing structure 312, which are adjacent to the display 320. The rear surface of the electronic device 300 may include a first rear cover 380, a partial area of the first housing structure 311 adjacent to the first rear cover 380, a second rear cover 390, a partial area of the second housing structure 312 adjacent to the second rear cover 390.

In an embodiment, the display 320 may refer to a display having at least a partial area configured to deform into a flat or curved shape. In an embodiment, the display 320 may include a folding area 323, a first area 321 disposed on one side of the folding area 323 (left side in FIG. 3A), and a second area 322 disposed on the other side of the folding area 323 (right side in FIG. 3A).

In an embodiment, the display 320 may include an OLED display of a top emission or bottom emission type. The OLED display may include a low temperature color filter (LTCF) layer, window glass (for example, ultra-thin glass (UTG) or polymer window), and/or an optically compensating film (for example, optical compensation film (OCF)). The LTCF layer of the OLED display may replace a polarizing film (or polarizing layer).

The area division of the display 320 is exemplary, and the display 320 may be divided into multiple (for example, two or more) areas according to the structure or function. In an embodiment, the area of the display 320 may be divided by a folding area 323 or folding axis A extending parallel to y-axis, but in another embodiment, the area of the display 320 may be divided with reference to another folding area (for example, folding area parallel to x-axis) or another folding axis (for example, folding axis parallel to x-axis).

In an embodiment, the first area 321 and the second area 322 may have symmetrical shapes as a whole around the folding area 323.

Hereinafter, operations of the first housing structure 311 and the second housing structure 312 according to the state of the electronic device 300 (for example, flat state and folded state), and respective areas of the display 320 will be described.

In an embodiment, when the electronic device 300 is in the flat state (for example, FIG. 3A), the first housing structure 311 and the second housing structure 312 may be disposed so as to face in substantially the same direction while forming an angle of about 180° therebetween. The surface of the first area 321 of the display 320 and the surface of the second area 322 thereof may form about 180° therebetween, and may face in substantially the same direction (for example, in the forward direction of the electronic device). The folding area 323 may form substantially the same plane with the first area 321 and the second area 322.

In an embodiment, when the electronic device 300 is in the folded state (for example, FIG. 3B), the first housing structure 311 and the second housing structure 312 may be disposed so as to face each other. The surface of the first area 321 of the display 320 and the surface of the second area 322 thereof may face other while forming a narrow angle (for example, about 0°-10°) therebetween. At least a part of the folding area 323 may be configured as a curved surface having a predetermined curvature.

In an embodiment, when the electronic device 300 is in the half-folded state, the first housing structure 311 and the second housing structure 312 may be disposed at a certain angle between each other. The surface of the first area 321 of the display 320 and the surface of the second area 322 thereof may form an angle smaller than that in the folded state and smaller than that in the flat state. At least a part of the folding area 323 may be configured as a curved surface having a predetermined curvature, which may be smaller than that in the folded state.

The electronic device according to various embodiments of the disclosure may include electronic devices such as a bar type, a foldable type, a rollable type, a sliding type, a wearable type, a tablet PC, and/or a laptop PC. The electronic device 200 according to various embodiments of the disclosure is not limited to the above-mentioned examples, and may include various other electronic devices.

FIG. 4 illustrates sound waves output from multiple speakers in a first state (for example, flat state) of a foldable electronic device. FIG. 5 illustrates sound waves output from multiple speakers in a second state (for example, folded state) of a foldable electronic device.

Referring to FIG. 4 and FIG. 5, the foldable electronic device 400 may include a first housing 410 (for example, first housing structure 311 in FIG. 3A and FIG. 3B), a second housing 420 (for example, second housing structure 312 in FIG. 3A and FIG. 3B), a hinge unit 430 configured to connect the first housing 410 and the second housing 420, a first speaker 440 disposed in the first housing 410, and a second speaker 450 disposed in the second housing 420.

In an embodiment, when the foldable electronic device 400 is in a first state (for example, flat state), the first speaker 440 and the second speaker 450 may output sound waves of the same sound source by operation of the audio DSP (for example, audio DSP 240 in FIG. 2). For example, when a sound source is played in the first state (for example, flat state) of the foldable electronic device 400, the first speaker 440 may output a first sound wave 441, and the second speaker 450 may output a second sound wave 451. For example, a sound source is played in the first state (for example, flat state) of the foldable electronic device 400, the first sound wave 441 output from the first speaker 440 and the second sound wave 451 output from the second speaker 450 may have the same phase.

In an embodiment, when a sound source is played in the second state (for example, folded state) of the foldable electronic device 400, the first speaker 440 and the second speaker 450 may output sound waves of the same sound source by operation of the audio DSP (for example, audio DSP 240 in FIG. 2). For example, when a sound source is played in the second state (for example, folded state) of the foldable electronic device 400, the first speaker 440 may output a first sound wave 441, and the second speaker 450 may output a second sound wave 451. For example, when the foldable electronic device 400 is in the second state (for example, folded state), the first housing 410 and the second housing 420 are folded so as to abut each other (for example, come close) with reference to the hinge unit 430, and the first speaker 440 and the second speaker 450 are thus positioned to abut each other (for example, come close). Therefore, the first sound wave 441 output from the first speaker 440 and the second sound wave 451 output from the second speaker 450 have different phases (for example, 180° difference). For example, due to the phase difference (for example, 180° difference) between the sound waves 441, 451 output from the first speaker 440 and the second speaker 450, the sound waves 441, 451 may counterbalance each other, thereby reducing the overall sound output. For example, if the first speaker 440 and the second speaker 450 are configured to have the same output characteristics, there are restrictions on securing flat frequency response characteristics in all audible frequency bands. For example, frequency response characteristics of at least one of the first speaker 440 and the second speaker 450 may be tuned, but the trade-off between high, middle, and low frequency bands place restrictions on satisfying all characteristics in high, middle, and low frequency bands.

Figure 6:
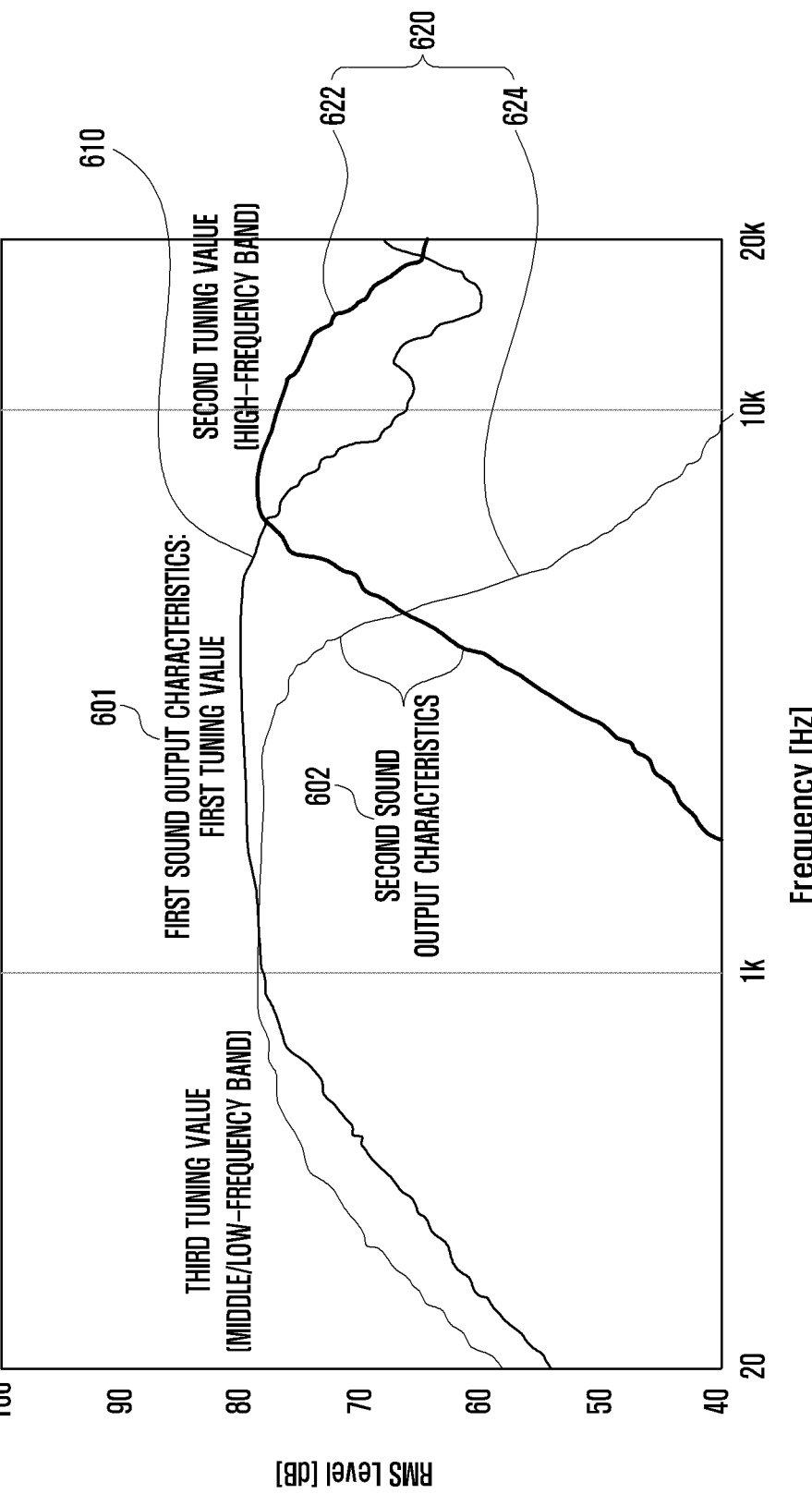
FIG. 6 illustrates a method for configuring tuning values of multiple speakers of an electronic device according to an embodiment of the disclosure.

FIG. 6 illustrates a method for configuring tuning values of multiple speakers of an electronic device according to an embodiment of the disclosure. FIG. 7 illustrates a foldable electronic device according to an embodiment of the disclosure, which has four speakers disposed thereon, and which is divided into a first portion and a second portion in order to control frequency response characteristics of the speakers. FIG. 8 illustrates a foldable electronic device according to an embodiment of the disclosure, which has four speakers disposed thereon, and which is divided into a first area and a second area in order to control stereo left and right outputs.

Referring to FIG. 6 to FIG. 8, the foldable electronic device 700 according to an embodiment of the disclosure (for example, electronic device 200 in FIG. 2, electronic device 300 in FIG. 3A and FIG. 3B) may include a first housing 710 (for example, first housing structure 311 in FIG. 3A and FIG. 3B), a second housing 720 (for example, second housing structure 312 in FIG. 3A and FIG. 3B), a hinge unit (for example, hinge unit 430 in FIG. 4 and FIG. 5) configured to connect the first housing 710 and the second housing 720, a display 730 (for example, display 320 in FIG. 3 and FIG. 4), and multiple speakers 740, 750, 760, 770 (for example, multiple speakers 211, 212, 213, 214 in FIG. 2).

In an embodiment, the first housing 710 and the second housing 720 may be coupled by the hinge unit 430 to be able to fold/unfold. The display 730 (for example, flexible display or foldable display) may extend from one surface of the first housing 710 to one surface of the second housing 720, and may be disposed to be supported by the first housing 710 and the second housing 720. For example, the display 730 may include a flexible display or a foldable display. For example, the surface on which the display 730 is disposed may be defined as the first surface or front surface of the electronic device 700 (for example, surface on which a screen is displayed when unfolded). The opposite surface of the front surface may be defined as the second surface or rear surface of the electronic device 700. A surface surrounding the space between the front and rear surfaces may be defined as the third surface or side surface of the electronic device 700. For example, speaker holes 705 may be formed on the side surface of the electronic device 700 such that sound waves are output from the multiple speakers 740, 750, 760, 770 to the outside. For example, the display 730 of the electronic device 700 may be folded (for example, folding) or unfolded (for example, unfolding) in a first direction (for example, x-axis direction) with reference to a folding axis (for example, A-axis).

In an embodiment, multiple speakers (for example, multiple speakers 211, 212, 213, 214 in FIG. 2, multiple speakers 740, 750, 760, 770 in FIG. 7 and FIG. 8) may be disposed in the first housing 710 and the second housing 720.

For example, the first speaker 740 and the second speaker 750 may be disposed in the first housing 710. The first speaker 740 may be disposed on the upper side with reference to the y-axis inside the first housing 710, and the second speaker 750 may be disposed on the lower side with reference to the y-axis. Without being limited thereto, one speaker may be disposed in the first housing 710, and three or more speakers may be disposed therein.

For example, the third speaker 760 and the fourth speaker 770 may be disposed in the second housing 720. The third speaker 760 may be disposed on the upper side with reference to the y-axis inside the second housing 720, and the fourth speaker 770 may be disposed on the lower side with reference to the y-axis. Without being limited thereto, one speaker may be disposed in the second housing 720, and three or more speakers may be disposed therein.

In an embodiment, multiple speakers 740, 750, 760, 770 may be disposed in the foldable electronic device 700 according to an embodiment of the disclosure, and the same may be divided into a first portion 701 and a second portion 702 in order to control the frequency response characteristics of the multiple speakers 740, 750, 760, 770.

In an embodiment, multiple speakers 740, 750, 760, 770 may be disposed in the foldable electronic device 700 according to an embodiment of the disclosure, and the same may be divided into a first area 703 and a second area 704 in order to control stereo left and right outputs of the multiple speakers 740, 750, 760, 770.

In an embodiment, according to the folding state of the foldable electronic device 700 (for example, folded state, flat state), the audio DSP (for example, audio DSP 240 in FIG. 2) may control the output characteristics of the multiple speakers 740, 750, 760, 770 under the control of the processor (processor 120 in FIG. 1, processor 220 in FIG. 2). For example, the output characteristics of the multiple speakers 740, 750, 760, 770 may include first sound output characteristics 601 and second sound output characteristics 602.

For example, the processor 120, 220 may determine whether the foldable electronic device 700 is in a first state (for example, folded state), in a second state (for example, flat state), or in a third state (for example, intermediate state). For example, the processor 120, 220 may control the audio DSP (for example, audio DSP 240) in order to control the frequency response characteristics (for example, first sound output characteristics 601 and second sound output characteristics 602) of the multiple speakers 740, 750, 760, 770, based on the state of the foldable electronic device 700.

For example, the audio DSP 240 may selectively apply tuning values 610, 620 to each of the multiple speakers 740, 750, 760, 770 according to the first state (for example, folded state), second state (for example, flat state), or third state (for example, intermediate state) of the foldable electronic device 700, based on control of the processor 120, 220.

In an embodiment, according to the state (for example, folded state, flat state, intermediate state) of the foldable electronic device 700, the audio DSP 240 may apply a tuning value (for example, first tuning value 610) such that the multiple speakers 740, 750, 760, 770 all have first sound output characteristics 601 under the control of the processor 220.

In an embodiment, according to the state (for example, folded state, flat state, intermediate state) of the foldable electronic device 700, the audio DSP 240 may apply a tuning value (for example, changed tuning value 620) such that the multiple speakers 740, 750, 760, 770 all have second sound output characteristics 602 under the control of the processor 220.

In an embodiment, according to the state (for example, folded state, flat state, intermediate state) of the foldable electronic device 700, the audio DSP 240 may apply a tuning value (for example, first tuning value 610) such that some of the multiple speakers 740, 750, 760, 770 have first sound output characteristics 601 under the control of the processor 220, and may apply a tuning value (for example, changed tuning value 620) such that some remaining speakers have second sound output characteristics 602.

For example, the first tuning value 610 is for endowing a speaker with first sound output characteristics 601, and may refer to a value tuned such that one speaker outputs the entire band (for example, 20 Hz-20 kHz) of the output frequency. For example, based on the control of the processor 220, the audio DSP 240 may apply the first tuning value 610 to at least one or all of the multiple speakers 740, 750, 760, 770 according to the folding state (for example, folded state, flat state) of the foldable electronic device 700.

For example, the changed tuning value 620 is for endowing a speaker with second sound output characteristics 602, and may refer to a value tuned such that one speaker outputs a part (for example, high frequency band, middle frequency band) of the output frequency band. The changed tuning value 620 may include a second tuning value 622 (for example, high-frequency band tuning value) tuned such that a speaker outputs the high frequency band among the second sound output characteristics 602, and a third tuning value 624 (for example, middle/low-frequency band tuning value) tuned such that a speaker outputs the middle/low frequency band among the second sound output characteristics 602.

For example, based on the control of the processor 220, the audio DSP 240 may apply the changed tuning value 620 to all of the multiple speakers 740, 750, 760, 770 according to the folding state (for example, folded state, flat state) of the foldable electronic device 700. Without being limited thereto, based on the control of the processor 220, the audio DSP 240 may apply the changed tuning value 620 to some of the multiple speakers 740, 750, 760, 770 according to the folding state (for example, folded state, flat state) of the foldable electronic device 700.

For example, when the second tuning value 622 (for example, high-frequency band tuning value) has been applied to a speaker, response characteristics in the high frequency band among the entire band (for example, 20 Hz-20 kHz) of the output frequency may be raised, and middle/low-frequency band output characteristics may be lowered. The speaker having the second tuning value 622 (for example, high-frequency band tuning value) applied thereto outputs sounds in a substantially high-frequency band among the entire band (for example, 20 Hz-20 kHz) of the output frequency, but the middle/low-frequency band output is not completely tuned off.

For example, when the third tuning value 624 (for example, middle/low-frequency band tuning value) has been applied to a speaker, response characteristics in the middle/low-frequency band among the entire band (for example, 20 Hz-20 kHz) of the output frequency may be raised, and high-frequency band output characteristics may be lowered. The speaker having the third tuning value 624 (for example, middle/low-frequency band tuning value) applied thereto outputs sounds in a substantially middle/low-frequency band among the entire band (for example, 20 Hz-20 kHz) of the output frequency, but the high-frequency band output is not completely tuned off.

Figure 9:
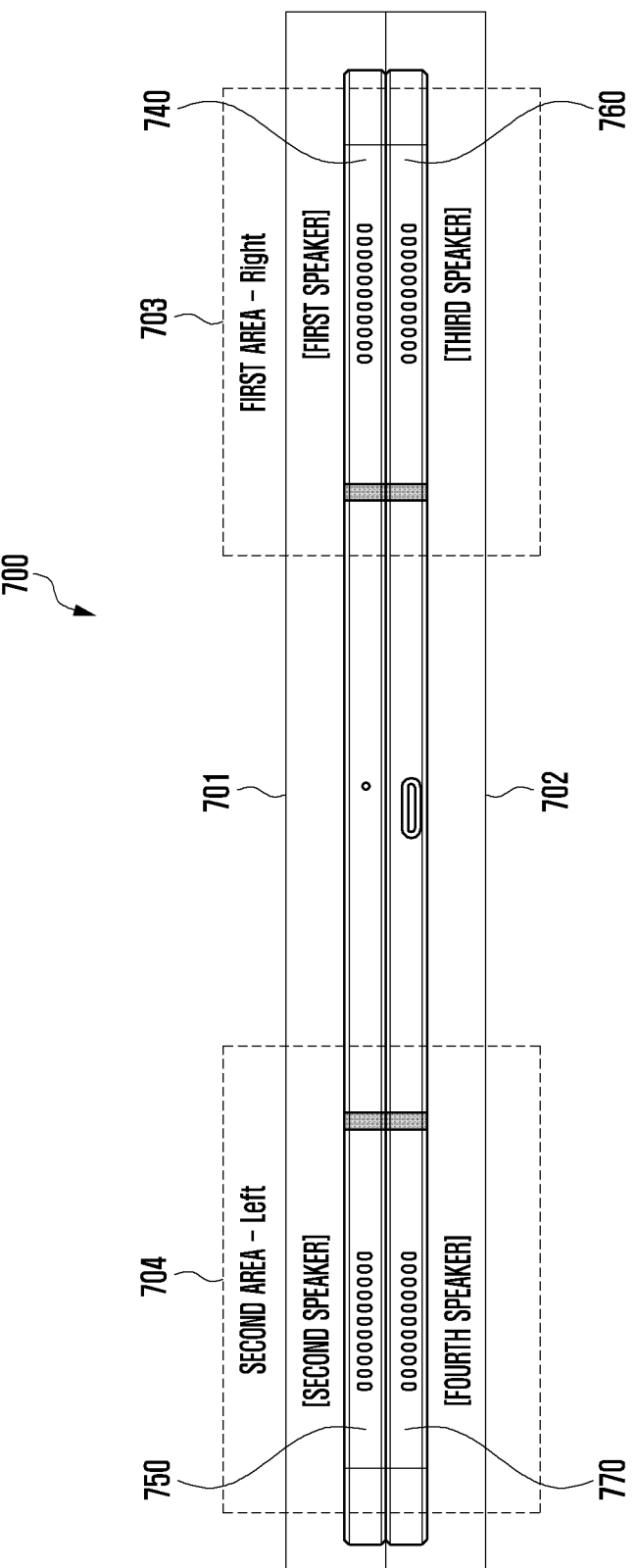
FIG. 9 illustrates controlling frequency response characteristics and stereo output of speakers of a foldable electronic device according to an embodiment of the disclosure.

FIG. 9 illustrates controlling frequency response characteristics and stereo output of speakers of a foldable electronic device according to an embodiment of the disclosure. FIG. 10 is a diagram 1000 illustrating controlling frequency response characteristics and stereo output of speakers in a first state (for example, flat state) of a foldable electronic device according to an embodiment of the disclosure.

Referring to FIG. 6, FIG. 9, and FIG. 10, in an embodiment, the sensor module (for example, sensor module 270 in FIG. 2) may sense the folding angle of the foldable electronic device 700. The sensor module 270 may generate sensing data according to the folding angle of the foldable electronic device 700, and may provide the sensing data to the processor 220. The processor (for example, processor 120 in FIG. 1, processor 220 in FIG. 2) may determine the folding state (for example, folded state, flat state) of the foldable electronic device 700, based on sensing data input from the sensor module 270. For example, the processor 220 may determine whether the foldable electronic device 700 is in a first state (for example, flat state) or in a second state (for example, folded state), based on sensing data input from the sensor module (for example, sensor module 270 in FIG. 2).

For example, the processor 220 may determine whether the foldable electronic device 700 is in a third state (for example, intermediate state between flat and folded states), based on sensing data input from the sensor module (for example, sensor module 270 in FIG. 2).

For example, the processor 220 may determine whether the foldable electronic device 700 is transitioning from the first state (for example, flat state) to the second state (for example, folded state), based on sensing data input from the sensor module (for example, sensor module 270 in FIG. 2).

For example, the processor 220 may determine whether the foldable electronic device 700 is transitioning from the second state (for example, folded state) to the first state (for example, flat state), based on sensing data input from the sensor module (for example, sensor module 270 in FIG. 2).

In an embodiment, when the foldable electronic device 700 is in the first state (for example, flat state), the processor 220 may control the audio DSP (for example, audio DSP 240 in FIG. 2) such that the frequency characteristics of the first to fourth speakers 740, 750, 760, 770 output the entire output frequency band.

In an embodiment, when the foldable electronic device 700 is in the first state (for example, flat state), the audio DSP 240 may apply the first tuning value 610 to the first speaker 740 such that the first speaker 740 disposed in the first housing (for example, first housing 710 in FIG. 7 and FIG. 8) has first sound output characteristics 601, based on the control of the processor 220. For example, the audio DSP 240 may apply the first tuning value 610 to the first speaker 740 disposed on the first portion 701 (for example, first portion 701 in FIG. 7 and FIG. 8), based on the control of the processor 220. For example, when the foldable electronic device 700 is in the first state (for example, flat state), the audio DSP 240 may apply, based on the control of the processor 220, such that the first speaker 740 disposed in the first housing 710 outputs a sound wave corresponding to the left channel of stereo. Accordingly, when the foldable electronic device 700 is in the first state (for example, flat state), the first speaker 740 disposed in the first housing (for example, first housing 710 in FIG. 7 and FIG. 8) may output a sound wave having the first sound output characteristics 601. The first speaker 740, to which the first sound output characteristics 601 following the first tuning value 610 are applied, may output the entire output frequency band and may output a sound wave corresponding to the left channel.

For example, when the foldable electronic device 700 is in the first state (for example, flat state), the audio DSP 240 may apply the first tuning value 610 to the second speaker 750 such that the second speaker 750 disposed in the first housing has first sound output characteristics 601, based on the control of the processor 220. For example, the audio DSP 240 may apply the first tuning value 610 to the second speaker 750 disposed on the first portion 701 (for example, first portion 701 in FIG. 7 and FIG. 8), based on the control of the processor 220. For example, when the foldable electronic device 700 is in the first state (for example, flat state), the audio DSP 240 may apply, based on the control of the processor 220, such that the second speaker 750 disposed in the first housing 710 outputs a sound wave corresponding to the left channel of stereo. Accordingly, when the foldable electronic device 700 is in the first state (for example, flat state), the second speaker 750 disposed in the first housing 710 may output a sound wave having the first sound output characteristics 601. The second speaker 750, to which the first sound output characteristics 601 following the first tuning value 610 are applied, may output the entire output frequency band and may output a sound wave corresponding to the left channel.

For example, when the foldable electronic device 700 is in the first state (for example, flat state), the audio DSP 240 may apply the first tuning value 610 to the third speaker 760 such that the third speaker 760 disposed in the second housing 720 has first sound output characteristics 601, based on the control of the processor 220. For example, the audio DSP 240 may apply the first tuning value 610 to the third speaker 760 disposed on the second portion 702 (for example, second portion 702 in FIG. 7 and FIG. 8), based on the control of the processor 220. For example, when the foldable electronic device 700 is in the first state (for example, flat state), the audio DSP 240 may apply, based on the control of the processor 220, such that the third speaker 760 disposed in the second housing 720 outputs a sound wave corresponding to the right channel of stereo. Accordingly, when the foldable electronic device 700 is in the first state (for example, flat state), the third speaker 760 disposed in the second housing 720 may output a sound wave having the first sound output characteristics 601. The third speaker 760, to which the first sound output characteristics 601 following the first tuning value 610 are applied, may output the entire output frequency band and may output a sound wave corresponding to the right channel.

For example, when the foldable electronic device 700 is in the first state (for example, flat state), the audio DSP 240 may apply the first tuning value 610 to the fourth speaker

770 such that the fourth speaker 770 disposed in the second housing 720 has first sound output characteristics 601, based on the control of the processor 220. For example, the audio DSP 240 may apply the first tuning value 610 to the fourth speaker 770 disposed on the second portion 702 (for example, second portion 702 in FIG. 7 and FIG. 8), based on the control of the processor 220. For example, when the foldable electronic device 700 is in the first state (for example, flat state), the audio DSP 240 may apply, based on the control of the processor 220, such that the fourth speaker 770 disposed in the second housing 720 outputs a sound wave corresponding to the right channel of stereo. Accordingly, when the foldable electronic device 700 is in the first state (for example, flat state), the fourth speaker 770 disposed in the second housing 720 may output a sound wave having the first sound output characteristics 601. The fourth speaker 770, to which the first sound output characteristics 601 following the first tuning value 610 are applied, may output the entire output frequency band and may output a sound wave corresponding to the right channel.

The foldable electronic device 700 according to an embodiment of the disclosure, when in the first state (for example, flat state), may apply the first tuning value 610 to multiple speakers 740, 750, 760, 770. The first sound output characteristics 601 following the first tuning value 601 may be applied to the multiple speakers 740, 750, 760, 770. As the multiple speakers 740, 750, 760, 770 output the entire output frequency band and output stereo sound waves, the foldable electronic device 700 may secure flat frequency characteristics in the entire output frequency band.

FIG. 11 is a diagram 1100 illustrating controlling frequency response characteristics and stereo output of speakers in a second state (for example, folded state) of a foldable electronic device according to an embodiment of the disclosure.

Referring to FIG. 6, FIG. 9, and FIG. 11, in an embodiment, the sensor module (for example, sensor module 270 in FIG. 2) may sense the folding angle of the foldable electronic device 700. The sensor module 270 may generate sensing data according to the folding angle of the foldable electronic device 700, and may provide the sensing data to the processor 220. The processor (for example, processor 120 in FIG. 1, processor 220 in FIG. 2) may determine the folding state (for example, folded state, flat state) of the foldable electronic device 700, based on sensing data input from the sensor module 270.

For example, the processor 220 may determine whether the foldable electronic device 700 is in a first state (for example, flat state) or in a second state (for example, folded state), based on sensing data input from the sensor module (for example, sensor module 270 in FIG. 2).

For example, the processor 220 may determine whether the foldable electronic device 700 is in a third state (for example, intermediate state between flat and folded states), based on sensing data input from the sensor module (for example, sensor module 270 in FIG. 2).

For example, the processor 220 may determine whether the foldable electronic device 700 is transitioning from the first state (for example, flat state) to the second state (for example, folded state), based on sensing data input from the sensor module (for example, sensor module 270 in FIG. 2).

For example, the processor 220 may determine whether the foldable electronic device 700 is transitioning from the second state (for example, folded state) to the first state (for example, flat state), based on sensing data input from the sensor module (for example, sensor module 270 in FIG. 2).

In an embodiment, when the foldable electronic device 700 is in the second state (for example, folded state), the processor 220 may control the audio DSP (for example, audio DSP 240 in FIG. 2) such that the frequency characteristics of the first to fourth speakers 740, 750, 760, 770 output sounds in a substantially high-frequency band and/or middle/low-frequency band among the entire output frequency band.

In an embodiment, when the foldable electronic device 700 is in the second state (for example, folded state), the audio DSP 240 may apply a changed tuning value 620 to the first speaker 740 such that the first speaker 740 disposed in the first housing (for example, first housing 710 in FIG. 7 and FIG. 8) has second sound output characteristics 602, based on the control of the processor 220. For example, the audio DSP 240 may apply the second tuning value 622 (for example, high-frequency band tuning value) among changed tuning values 620 to the first speaker 740 disposed in the first portion 703 (for example, first portion 703 in FIG. 8), based on the control of the processor 220. For example, when the foldable electronic device 700 is in in the second state (for example, folded state), the audio DSP 240 may apply, based on the control of the processor 220, such that the first speaker 740 disposed in the first housing 710 outputs a sound wave corresponding to the right channel of stereo. For example, when the foldable electronic device 700 is in in the second state (for example, folded state), the audio DSP 240 may apply, based on the control of the processor 220, such that the first speaker 740 disposed in the first area 703 outputs a sound wave corresponding to the right channel of stereo. Accordingly, when the foldable electronic device 700 is in the second state (for example, folded state), the first speaker 740 disposed in the first area 703 may output a sound wave having the second sound output characteristics 602. The first speaker 740, to which the second sound output characteristics 602 following the second tuning value 622 (for example, high-frequency band tuning value) among changed tuning values 620 are applied, may output sounds in the high-frequency band among the output frequency band and may output a sound wave corresponding to the right channel.

For example, when the foldable electronic device 700 is in the second state (for example, folded state), the audio DSP 240 may apply a changed tuning value 620 to the second speaker 750 such that the second speaker 750 disposed in the first housing has second sound output characteristics 602, based on the control of the processor 220. For example, the audio DSP 240 may apply the second tuning value 622 (for example, high-frequency band tuning value) among changed tuning values 620 to the second speaker 750 disposed in the second area 704 (for example, second area 704 in in FIG. 7 and FIG. 8), based on the control of the processor 220. For example, when the foldable electronic device 700 is in the second state (for example, folded state), the audio DSP 240 may apply, based on the control of the processor 220, such that the second speaker 750 disposed in the first housing 710 outputs a sound wave corresponding to the left channel of stereo. For example, when the foldable electronic device 700 is in in the second state (for example, folded state), the audio DSP 240 may apply, based on the control of the processor 220, such that the second speaker 750 disposed in the second area 704 outputs a sound wave corresponding to the left channel of stereo. Accordingly, when the foldable electronic device 700 is in the second state (for example, folded state), the second speaker 750 disposed in the second area 704 may output a sound wave having the second sound output characteristics 602. The second speaker 750, to which the second sound output characteristics 602 following the second tuning value 622 (for example, high-frequency band tuning value) among changed tuning values 620 are applied, may output the high-frequency band among the output frequency band and may output a sound wave corresponding to the left channel.

For example, when the foldable electronic device 700 is in the in the second state (for example, folded state), the audio DSP 240 may apply a changed tuning value 620 to the third speaker 760 such that the third speaker 760 disposed in the second housing 720 (for example, second housing 720 in FIG. 7 and FIG. 8) has second sound output characteristics 602, based on the control of the processor 220. For example, the audio DSP 240 may apply the third tuning value 624 (for example, middle/low-frequency band tuning value) among changed tuning values 620 to the third speaker 760 disposed in the first area 703 (for example, first area 703 in FIG. 8), based on the control of the processor 220. For example, when the foldable electronic device 700 is in the second state (for example, folded state), the audio DSP 240 may apply, based on the control of the processor 220, such that the third speaker 760 disposed in the second housing 720 outputs a sound wave corresponding to the right channel of stereo. For example, when the foldable electronic device 700 is in in the second state (for example, folded state), the audio DSP 240 may apply, based on the control of the processor 220, such that the third speaker 760 disposed in the first area 703 outputs a sound wave corresponding to the right channel of stereo. Accordingly, when the foldable electronic device 700 is in the second state (for example, folded state), the third speaker 760 disposed in the first area 703 may output a sound wave having the second sound output characteristics 602. The third speaker 760, to which the second sound output characteristics 602 following the third tuning value 624 (for example, middle/low-frequency band tuning value) among changed tuning values 620 are applied, may output the middle/low-frequency band among the output frequency band and may output a sound wave corresponding to the right channel.

For example, when the foldable electronic device 700 is in the in the second state (for example, folded state), the audio DSP 240 may apply a changed tuning value 620 to the fourth speaker 770 such that the fourth speaker 770 disposed in the second housing 720 (for example, second housing 720 in FIG. 7 and FIG. 8) has second sound output characteristics 602, based on the control of the processor 220. For example, the audio DSP 240 may apply the third tuning value 624 (for example, middle/low-frequency band tuning value) among changed tuning values 620 to the fourth speaker 770 disposed in the second area 704 (for example, second area 704 in FIG. 7 and FIG. 8), based on the control of the processor 220. For example, when the foldable electronic device 700 is in the second state (for example, folded state), the audio DSP 240 may apply, based on the control of the processor 220, such that the fourth speaker 770 disposed in the second housing 720 outputs a sound wave corresponding to the left channel of stereo. For example, when the foldable electronic device 700 is in in the second state (for example, folded state), the audio DSP 240 may apply, based on the control of the processor 220, such that the fourth speaker 770 disposed in the second area 704 outputs a sound wave corresponding to the left channel of stereo. Accordingly, when the foldable electronic device 700 is in the second state (for example, folded state), the fourth speaker 770 disposed in the second area 704 may output a sound wave having the second sound output characteristics 602. The fourth fourth 770, to which second sound output characteristics 602 following the third tuning value 624 (for example, middle/low-frequency band tuning value) among changed tuning values 620 are applied, may output the middle/low-frequency band among the output frequency band and may output a sound wave corresponding to the left channel.

When the foldable electronic device 700 according to an embodiment of the disclosure is in the in the second state (for example, folded state), a changed tuning value 620 may applied to the multiple speakers 740, 750, 760, 770. Second sound output characteristics 602 following the changed tuning value 620 may be applied to the multiple speakers 740, 750, 760, 770. Among the multiple speakers 740, 750, 760, 770, the first speaker 740 and the second speaker 750 may outputs sounds in a substantially high-frequency band among the entire output frequency band, thereby outputting a stereo sound wave. Among the multiple speakers 740, 750, 760, 770, the third speaker 760 and the fourth speaker 770 may outputs sounds in a substantially middle/low-frequency band among the entire output frequency band, thereby outputting a stereo sound wave.

The first speaker 740, to which the second tuning value 622 (for example, high-frequency band tuning value) is applied, may output a right-channel sound wave; the second speaker 750, to which the second tuning value 622 (for example, high-frequency band tuning value) is applied, may output a left-channel sound wave; the third speaker 760, to which the third tuning value 624 (for example, middle/low-frequency band tuning value) is applied, may output a right-channel sound wave; and the fourth speaker 770, to which the third tuning value 624 (for example, middle/low-frequency band tuning value) is applied, may output a left-channel sound wave, thereby securing flat frequency characteristics in the entire output frequency band.

Figure 12:
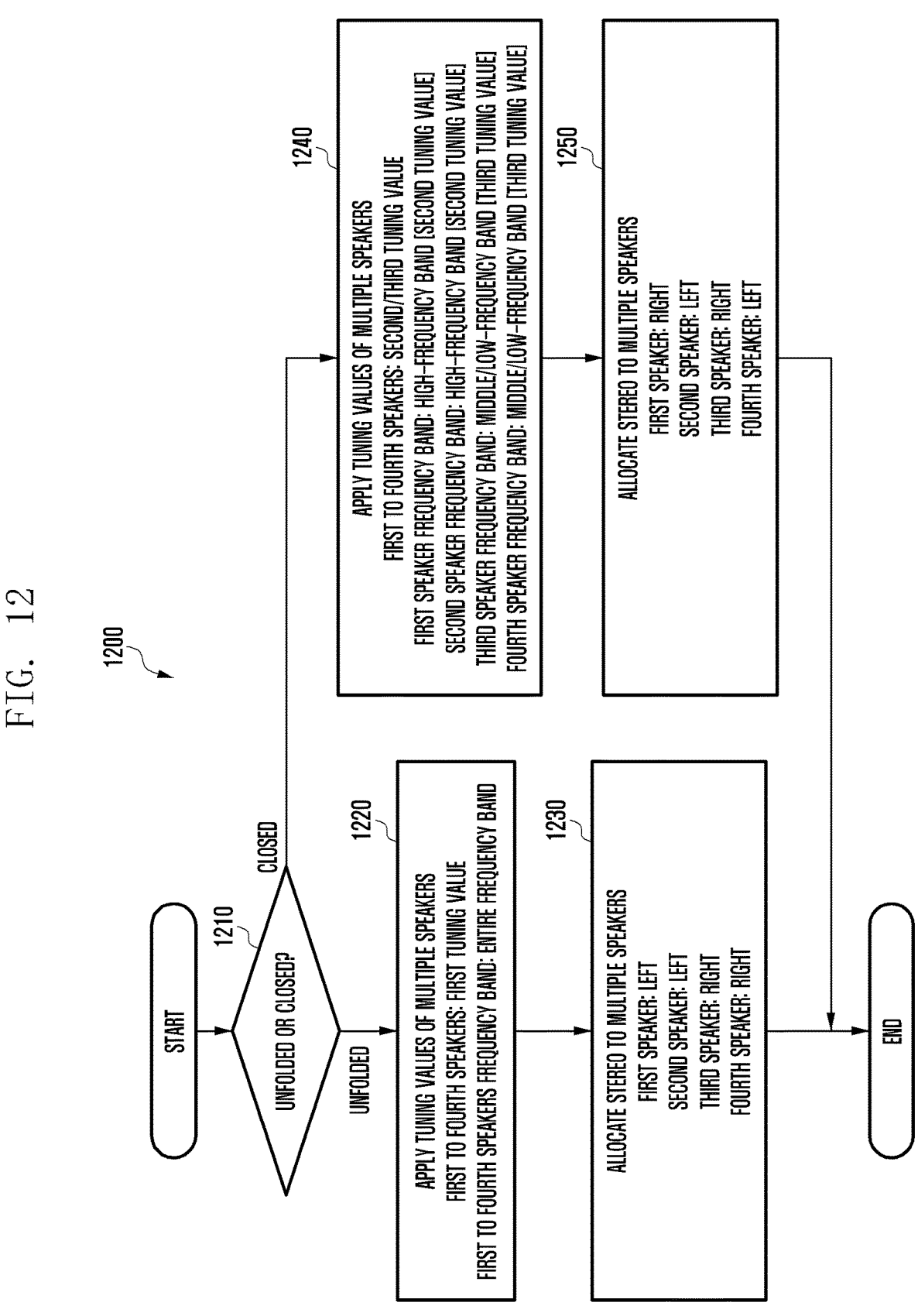
FIG. 12 illustrates a method for operating a foldable electronic device according to an embodiment of the disclosure according to a first state (for example, flat state) or a second state (for example, folded state).

FIG. 12 illustrates a method for operating a foldable electronic device according to an embodiment of the disclosure according to a first state (for example, flat state) or a second state (for example, folded state).

Referring to FIG. 12, in operation 1210, the processor (for example, processor 120 in FIG. 1, processor 220 in FIG. 2) may determine whether the foldable electronic device (for example, foldable electronic device 700 in FIG. 7 to FIG. 9) is in a first state (for example, flat state) or in a second state (for example, folded state). For example, the processor 220 may determine whether the foldable electronic device 700 is in a first state (for example, flat state) or in a second state (for example, folded state), based on sensing data input from the sensor module (for example, sensor module 270 in FIG. 2).

When it is determined in operation 1210 that the foldable electronic device 700 is in the first state (for example, flat state), the processor 220 may proceed to operation 1220.

In operation 1220, when the foldable electronic device 700 is in the first state (for example, flat state), the processor 220 may control the audio DSP (for example, audio DSP 240 in FIG. 2) such that the first to fourth speakers (for example, first to fourth speakers 740, 750, 760, 770 in FIG. 7 to FIG. 9) have first sound output characteristics (for example, first sound output characteristics 601 in FIG. 6).

For example, the audio DSP 240 may apply a first tuning value (for example, first tuning value 610 in FIG. 6) to the first speaker 740 such that the first speaker 740 disposed in the first housing (for example, first housing 710 in FIG. 7 and FIG. 8) has first sound output characteristics 601, based on the control of the processor 220. For example, the audio DSP 240 may apply the first tuning value 610 to the first speaker 740 disposed on a first portion (for example, first portion 701 in FIG. 7), based on the control of the processor 220. The first speaker 740, to which the first tuning value 610 is applied, may output a sound wave having the first sound output characteristics 601.

For example, the audio DSP 240 may apply the first tuning value 610 to the second speaker 750 such that the second speaker 750 disposed in the first housing 710 has first sound output characteristics 601, based on the control of the processor 220. For example, the audio DSP 240 may apply the first tuning value 610 to the second speaker 750 disposed on the first portion 701, based on the control of the processor 220. The second speaker 750, to which the first tuning value 610 is applied, may output a sound wave having the first sound output characteristics 601.

For example, the audio DSP 240 may apply the first tuning value 610 to the third speaker 760 such that the third speaker 760 disposed in the second housing (for example, second housing 720 in FIG. 7 and FIG. 8) has first sound output characteristics 601, based on the control of the processor 220. For example, the audio DSP 240 may apply the first tuning value 610 to the third speaker 760 disposed on a second portion (for example, second portion 702 in FIG. 7), based on the control of the processor 220. The third speaker 760, to which the first tuning value 610 is applied, may output a sound wave having the first sound output characteristics 601.

For example, the audio DSP 240 may apply the first tuning value 610 to the fourth speaker 770 such that the fourth speaker 770 disposed in the second housing 720 has first sound output characteristics 601, based on the control of the processor 220. For example, the audio DSP 240 may apply the first tuning value 610 to the fourth speaker 770 disposed on the second portion 702, based on the control of the processor 220. The fourth speaker 770, to which the first tuning value 610 is applied, may output a sound wave having the first sound output characteristics 601.

In operation 1230, when the foldable electronic device 700 is in the first state (for example, flat state), the processor 220 may control the audio DSP 240 such that the first to fourth speakers 740, 750, 760, 770 allocate a stereo output direction (for example, left or right) (for example, stereo channel).

For example, when the foldable electronic device 700 is in the first state (for example, flat state), the audio DSP 240 may apply, based on the control of the processor 220, such that the first speaker 740 disposed in a first area (for example, first area 703 in FIG. 7 and FIG. 8) outputs a sound wave corresponding to the left channel of stereo. Accordingly, the first speaker 740, to which first sound output characteristics 601 following the first tuning value 610 are applied, may output the entire output frequency band and may output a sound wave corresponding to the left channel.

For example, when the foldable electronic device 700 is in the first state (for example, flat state), the audio DSP 240 may apply, based on the control of the processor 220, such that the second speaker 750 disposed in a second area (for example, second area 704 in FIG. 7 and FIG. 8) outputs a sound wave corresponding to the left channel of stereo. Accordingly, the second speaker 750, to which first sound output characteristics 601 following the first tuning value 610 are applied, may output the entire output frequency band and may output a sound wave corresponding to the left channel.

For example, when the foldable electronic device 700 is in the first state (for example, flat state), the audio DSP 240 may apply, based on the control of the processor 220, such that the third speaker 760 disposed in the first area 703 outputs a sound wave corresponding to the right channel of stereo. Accordingly, the third speaker 760, to which first sound output characteristics 601 following the first tuning value 610 are applied, may output the entire output frequency band and may output a sound wave corresponding to the right channel.

For example, when the foldable electronic device 700 is in the first state (for example, flat state), the audio DSP 240 may apply, based on the control of the processor 220, such that the fourth speaker 770 disposed in the second area 704 outputs a sound wave corresponding to the right channel of stereo. Accordingly, the fourth speaker 770, to which first sound output characteristics 601 following the first tuning value 610 are applied, may output the entire output frequency band and may output a sound wave corresponding to the right channel.

For example, operation 1220 and operation 1230 may be performed successively, or may be performed simultaneously.

The foldable electronic device 700 according to an embodiment of the disclosure, when in the first state (for example, flat state), may apply the first tuning value 610 to the multiple speakers 740, 750, 760, 770. The first sound output characteristics 601 following the first tuning value 610 may be applied to the multiple speakers 740, 750, 760, 770. As the multiple speakers 740, 750, 760, 770 output the entire output frequency band and output stereo sound waves, the foldable electronic device 700 may secure flat frequency characteristics in the entire output frequency band.

When it is determined in operation 1210 that the foldable electronic device 700 is in a second state (for example, folded state), the processor 220 may proceed to operation 1240.

In operation 1240, when the foldable electronic device 700 is in the second state (for example, folded state), the processor 220 may control the audio DSP (for example, audio DSP 240 in FIG. 2) such that the first to fourth speakers 740, 750, 760, 770 have second sound output characteristics (for example, second sound output characteristics 602 in FIG. 6). For example, when the foldable electronic device 700 is in the second state (for example, folded state), the processor 220 may control the audio DSP (for example, audio DSP 240 in FIG. 2) such that some speakers among the first to fourth speakers 740, 750, 760, 770 output sound waves in a substantially high-frequency band, and some of the remaining speakers output sound waves in a substantially middle/low-frequency band.

For example, when the foldable electronic device 700 is in the second state (for example, folded state), the audio DSP 240 may apply a changed tuning value (for example, changed tuning value in FIG. 6) to the first speaker 740 such that the first speaker 740 disposed on the first portion 704 has second sound output characteristics 602, based on the control of the processor 220. For example, the audio DSP 240 may apply a second tuning value (for example, second tuning value 622 in FIG. 6) (for example, high-frequency band tuning value) among changed tuning values 620 to the first speaker 740 disposed on the first portion 701, based on the control of the processor 220.

For example, when the foldable electronic device 700 is in the second state (for example, folded state), the audio DSP 240 may apply a changed tuning value 620 to the second speaker 750 such that the second speaker 750 disposed on the first portion 701 has second sound output characteristics 602, based on the control of the processor 220. For example, the audio DSP 240 may apply a second tuning value 622 (for example, high-frequency band tuning value) among changed tuning values 620 to the first speaker 740 disposed on the first portion 701, based on the control of the processor 220.

For example, when the foldable electronic device 700 is in the second state (for example, folded state), the audio DSP 240 may apply a changed tuning value 620 to the third speaker 760 such that the third speaker 760 disposed on the second portion 702 has second sound output characteristics 602, based on the control of the processor 220. For example, the audio DSP 240 may apply a third tuning value 624 (for example, middle/low-frequency band tuning value) among changed tuning values 620 to the third speaker 760 disposed on the second portion 702, based on the control of the processor 220.

For example, when the foldable electronic device 700 is in the second state (for example, folded state), the audio DSP 240 may apply a changed tuning value 620 to the fourth speaker 770 such that the fourth speaker 770 disposed on the second portion 702 has second sound output characteristics 602, based on the control of the processor 220. For example, the audio DSP 240 may apply a third tuning value 624 (for example, middle/low-frequency band tuning value) among changed tuning values 620 to the fourth speaker 770 disposed on the second portion 702, based on the control of the processor 220.

In operation 1250, when the foldable electronic device 700 is in the second state (for example, folded state), the processor 220 may control the audio DSP 240 such that the first to fourth speakers 740, 750, 760, 770 allocate a stereo output direction (for example, left channel or right channel) (for example, stereo channel).

For example, when the foldable electronic device 700 is in the second state (for example, folded state), the audio DSP 240 may apply, based on the control of the processor 220, such that the first speaker 740 disposed in a first area (for example, first area 703 in FIG. 8) outputs a sound wave corresponding to the right channel of stereo. Accordingly, the first speaker 740, to which a second tuning value (for example, second tuning value 622 in FIG. 6) (for example, high-frequency band tuning value) among changed tuning values 620 is applied, may output sounds in a high-frequency band among the entire output frequency band and may output a sound wave corresponding to the right channel.

For example, when the foldable electronic device 700 is in the second state (for example, folded state), the audio DSP 240 may apply, based on the control of the processor 220, such that the second speaker 750 disposed in a second area (for example, second area 704 in FIG. 8) outputs a sound wave corresponding to the left channel of stereo. Accordingly, the second speaker 750, to which a second tuning value 622 (for example, high-frequency band tuning value) among changed tuning values 620 is applied, may output sounds in a high-frequency band among the entire output frequency band and may output a sound wave corresponding to the left channel.

For example, when the foldable electronic device 700 is in the second state (for example, folded state), the audio DSP 240 may apply, based on the control of the processor 220, such that the third speaker 760 disposed in the first area 703 outputs a sound wave corresponding to the right channel of stereo. Accordingly, the third speaker 760, to which a third tuning value 624 (for example, middle/low-frequency band tuning value) among changed tuning values 620 is applied, may output sounds in a middle/low-frequency band among the entire output frequency band and may output a sound wave corresponding to the right channel.

For example, when the foldable electronic device 700 is in the second state (for example, folded state), the audio DSP

240 may apply, based on the control of the processor 220, such that the fourth speaker 770 disposed in the second area 704 outputs a sound wave corresponding to the left channel of stereo. Accordingly, the fourth speaker 770, to which a third tuning value 624 (for example, middle/low-frequency band tuning value) among changed tuning values 620 is applied, may output sounds in a middle/low-frequency band among the entire output frequency band and may output a sound wave corresponding to the left channel.

For example, operation 1240 and operation 1250 may be performed successively, or may be performed simultaneously.

In an embodiment, the first tuning value 610 and the changed tuning value 620 applied to the first speaker 740, the second speaker 750, the third speaker 760, and the fourth speaker 770 may include MB-DRC configuration values (for example, parameter values) as enumerated in Table 1. In an embodiment, based on the control of the processor (for example, processor 220 in FIG. 2), the audio DSP (for example, audio DSP 240 in FIG. 2) may adjust MB-DRC parameter values (for example, band frequency, band gain, LIMITER), thereby configuring a first tuning value 610, a second tuning value 622, and a third tuning value 624.

TABLE 1

| <MB-DRC> | |
|---|---|
| band | frequency |
| band 1 | 100 Hz |
| band 2 | 250 Hz |
| band 3 | 500 Hz |
| band 4 | 1 KHz |
| band 5 | 2 KHz |
| band 6 | 4 KHz |
| band 7 | 8 KHz |
| band 8 | 16 KHz | band gain: 0 to −50 dB
LIMITER: −50 to 0 dB

In an embodiment, the first tuning value 610 and the changed tuning value 620 applied to the first speaker 740, the second speaker 750, the third speaker 760, and the fourth speaker 770 may include OB-DRC configuration values (for example, parameter values) as enumerated in Table 2. In an embodiment, based on the control of the processor (for example, processor 220 in FIG. 2), the audio DSP (for example, audio DSP in FIG. 2) may adjust OB-DRC parameter values (for example, gain, LIMITER), thereby configuring a first tuning value 610, a second tuning value 622, and a third tuning value 624.

TABLE 2

| <OB-DRC> | |
|---|---|
| frequency band | 0 to 20 KHz |
| gain | 0 to −50 dB |
| LIMITER | −20 to 0 d |

In an embodiment, the first tuning value 610 and the changed tuning value 620 applied to the first speaker 740, the second speaker 750, the third speaker 760, and the fourth speaker 770 may include AM filter configuration values (for example, parameter values) as enumerated in Table 3. In an embodiment, based on the control of the processor (for example, processor 220 in FIG. 2), the audio DSP (for example, audio DSP 240 in FIG. 2) may adjust AM filter parameter values (for example, FILTER, center frequency, frequency bandwidth, gain), thereby configuring a first tuning value 610, a second tuning value 622, and a third tuning value 624.

TABLE 3

| <AM FILTER> | |
|---|---|
| FILTER | BOOST/CUT |
| center frequency designation | 0 to 20 KHz |
| frequency bandwidth | 1 Hz to 40 KHz |
| gain | −50 to 40 dB |

The foldable electronic device 700 according to an embodiment of the disclosure, when in a second state (for example, folded state), may apply a changed tuning value 620 to the multiple speakers 740, 750, 760, 770. Second sound output characteristics 602 following the changed tuning value 620 may be applied to the multiple speakers 740, 750, 760, 770. Among the multiple speakers 740, 750, 760, 770, a second tuning value 622 may be applied to the first speaker 740 and the second speaker 750, thereby outputting sounds in a substantially high-frequency band among the entire output frequency band and outputting a stereo sound wave. Among the multiple speakers 740, 750, 760, 770, a third tuning value 624 may be applied to the third speaker 760 and the fourth speaker 770, thereby outputting sounds in a substantially middle/low-frequency band among the entire output frequency band and outputting a stereo sound wave. The multiple speakers 740, 750, 760, 770 come to have second sound output characteristics 602 and output sound waves in a high-frequency band and a middle/low-frequency band, thereby securing flat frequency characteristics in the entire output frequency band.

At least some of the operations illustrated in FIG. 12 may be omitted. At least some operations mentioned with reference to other drawings in this document may be added and/or inserted before or after at least some of the operations illustrated in FIG. 12. The operations illustrated in FIG. 12 may be performed by a processor (for example, processor 120 in FIG. 1, processor 220 in FIG. 2). For example, the memory (for example, memory 130 in FIG. 1, memory 230 in FIG. 2) of the electronic device may store instructions which cause the processor 220 to perform at least some of the operations illustrated in FIG. 12.

FIG. 13 illustrates applying tuning values of multiple speakers in order to control the entire sound output according to a first state (for example, flat state) or a second state (for example, folded state) of a foldable electronic device according to an embodiment of the disclosure.

Referring to FIG. 10, FIG. 11, FIG. and 13, in an embodiment, when the foldable electronic device (for example, foldable electronic device 700 in FIG. 7 and FIG. 8) is in a first state (for example, flat state), first sound output characteristics (for example, sound output characteristics 601 in FIG. 6) following a first tuning value (for example, first tuning value 610 in FIG. 6) may be applied to the first to fourth speakers (for example, first speaker 740, second speaker 750, third speaker 760, fourth speaker 770 in FIG. 7 to FIG. 9) such that they have a first output level 1310 (for example, maximum available output) (for example, first maximum output level).

In an embodiment, when the foldable electronic device 700 is in a second state (for example, folded state), second sound output characteristics (for example, second sound output characteristics 602 in FIG. 6) following a second tuning value (for example, second tuning value 622 in FIG.

6) or a third tuning value (for example, third tuning value 624 in FIG. 6) may be applied to the first to fourth speakers (for example, first speaker 740, second speaker 750, third speaker 760, fourth speaker 770 in FIG. 7 and FIG. 8) such that they have a second output level 1320 lower than the first output level 1310 (for example, maximum output).

When the foldable electronic device 700 is in the second state (for example, folded state), a changed tuning value (for example, changed tuning value 620 in FIG. 6) is applied to the first to fourth speakers 740, 750, 760, 770 such that a pair of two speakers outputs sound waves in a high-frequency band and in a middle/low-frequency band. If the changed tuning value 620 is applied, the output of the speakers is divided into sound waves in the high-frequency band and middle/low-frequency band, and the overall output of the speakers may thus decrease about by half (for example, decrease about 3 dB) compared with when the first tuning value 610 is applied. As a result, the foldable electronic device 700 becomes unable to output the maximum volume.

In an embodiment, if the user selects the first output level 1310 (for example, maximum output) as the sound output level when the foldable electronic device 700 is in the second state (for example, folded state), the processor (for example, processor 220 in FIG. 2) may control the audio DSP (for example, audio DSP 240 in FIG. 2) such that the first tuning value 610 is applied to the first to fourth speakers 740, 750, 760, 770. For example, when the user selects the first output level 1310 (for example, 80 dB or higher) as the sound output level, the audio DSP 240 may apply the first tuning value 610 to the first to fourth speakers 740, 750, 760, 770, based on the control of the processor 220.

In an embodiment, if the user selects the second output level 1320 (for example, 79 dB or lower) lower than the first output level 1310 (for example, maximum level) when the foldable electronic device 700 is in the second state (for example, folded state), the processor (for example, processor 220 in FIG. 2) may control the audio DSP (for example, audio DSP 240 in FIG. 2) such that a changed tuning value 620 is applied to the first to fourth speakers 740, 750, 760, 770. For example, when the user selects the second output level 1320 (for example, 79 dB or lower) as the sound output level, the audio DSP 240 may apply the changed tuning value 620 to the first to fourth speakers 740, 750, 760, 770, based on the control of the processor 220.

The foldable electronic device 700 according to an embodiment of the disclosure may control the multiple speakers so as to output sounds at the maximum output regardless of the first state (for example, flat state) and the second state (for example, folded state).

Figure 14:
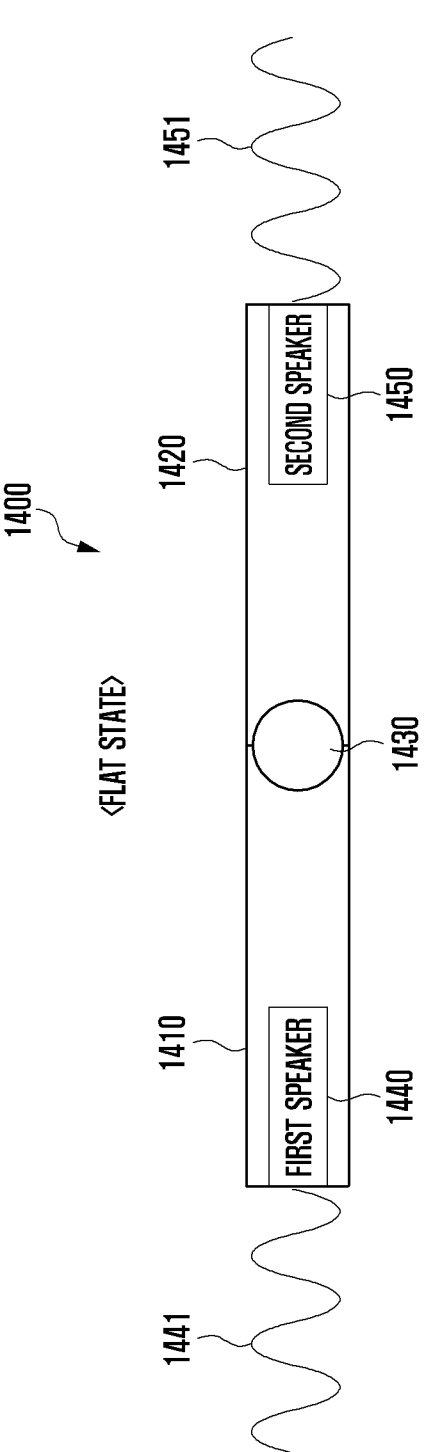
FIG. 14 illustrates sound waves output from multiple speakers in a first state (for example, flat state) of a foldable electronic device according to an embodiment of the disclosure.
Figure 15:
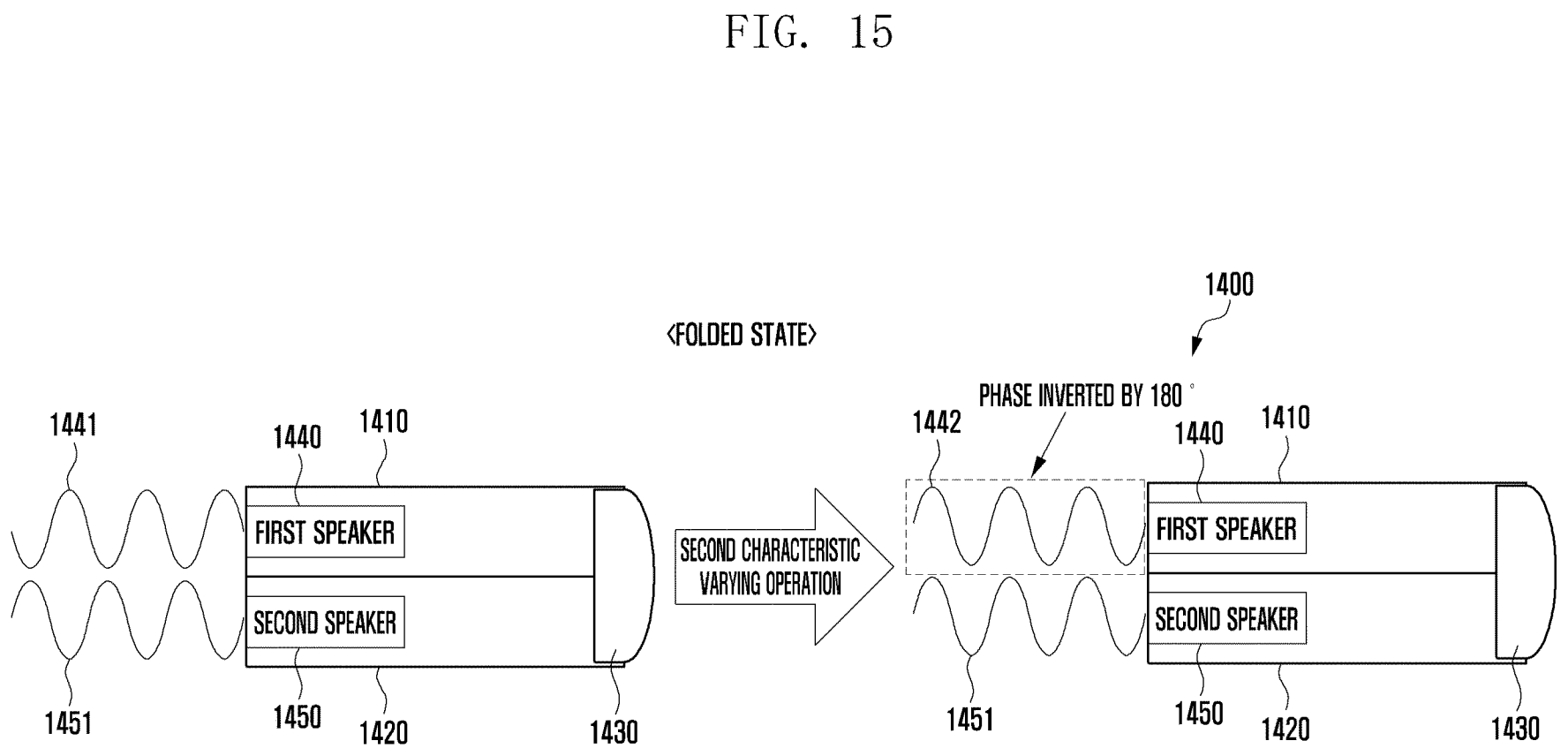
Figure 16:
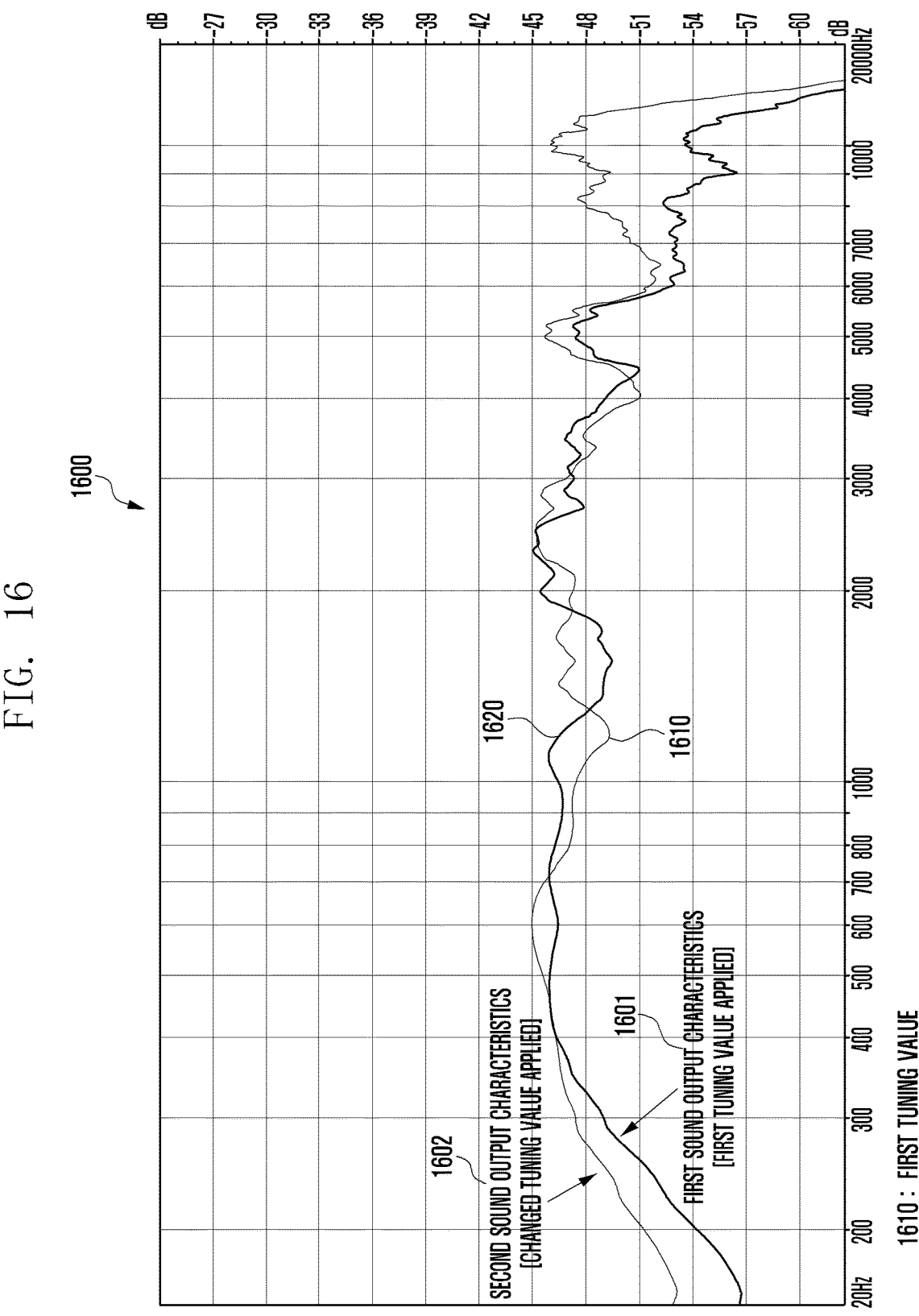
FIG. 16 illustrates frequency response characteristics as a result of applying a first tuning value and a second tuning value to multiple speakers of a foldable electronic device according to an embodiment of the disclosure.

FIG. 14 illustrates sound waves output from multiple speakers in a first state (for example, flat state) of a foldable electronic device according to an embodiment of the disclosure. FIG. 15 illustrates sound waves output from multiple speakers in a second state (for example, folded state) of a foldable electronic device according to an embodiment of the disclosure. FIG. 16 illustrates frequency response characteristics as a result of applying a first tuning value and a second tuning value to multiple speakers of a foldable electronic device according to an embodiment of the disclosure.

Referring to FIG. 14 to FIG. 16, the foldable electronic device 140 according to an embodiment of the disclosure may include a first housing 1410 (for example, first housing 710 in FIG. 7 and FIG. 8), a second housing 1420 (for example, second housing 720 in FIG. 7 and FIG. 8), a hinge unit 1430 (for example, hinge unit 430 in FIG. 4 and FIG. 5) connecting the first housing 1410 and the second housing 1420, a first speaker 1440 disposed in the first housing 1410, and a second speaker 1450 disposed in the second housing 1420.

In an embodiment, when the foldable electronic device 1400 is in a first state (for example, flat state), the audio DSP 420 may apply a first tuning value 1610 (for example, first tuning value 610 in FIG. 6) to the first speaker 1440 and the second speaker 1450 such that the first speaker 1440 and the second speaker 1450 have first sound output characteristics (for example, 1601), based on the control of the processor 220.

For example, when the foldable electronic device 1400 is in the first state (for example, flat state), the first sound wave 1441 output from the first speaker 1440 and the second sound wave 1451 output from the second speaker 1450 may have the same phase. In this case, since the first sound wave 1441 and the second sound wave 1451 do not counterbalance each other, and the audio DSP 240 may not change the phase of the first sound wave 1441 and that of the second sound wave 1451.

For example, when the foldable electronic device 1400 is in the second state (for example, folded state), the first housing 1410 and the second housing 1420 are folded to abut each other (for example, come close) with reference to the hinge unit 1430, and the first speaker 1440 and the second speaker 1450 are thus positioned to face in the same direction. Therefore, the first sound wave 1441 output from the first speaker 1440 and the second sound wave 1451 output from the second speaker 1450 have different phases (for example, 180° difference). For example, due to the difference in phase between the sound waves 1441, 1451 output from the first speaker 1440 and the second speaker 1450, the sound waves 1441, 1451 may counterbalance each other, thereby reducing the overall sound output of the foldable electronic device 1400.

In an embodiment, according to the folding state (for example, folded state, flat state) of the foldable electronic device 1400, the processor (for example, processor 120 in FIG. 1, processor 220 in FIG. 2) may control the audio DSP (for example, audio DSP 240 in FIG. 2) such that the phase of sound waves output from the multiple speakers 1440, 1450 is controlled. For example, the audio DSP 240 may control the phase of sound waves from at least one of the multiple speakers 1440, 1450, based on the control of the processor 220.

In an embodiment, when the foldable electronic device 1400 is in the second state (for example, folded state), the audio DSP 420 may apply a changed tuning value 1620 (for example, changed tuning value 620 in FIG. 6) to the first speaker 1440 and the second speaker 1450 such that the first speaker 1440 and the second speaker 1450 have second sound output characteristics 1602, based on the control of the processor 220. For example, the changed tuning value 1620 may include a second tuning value (for example, second tuning value 622 in FIG. 6) and a third tuning value (for example, third tuning value 624 in FIG. 6).

In an embodiment, when the foldable electronic device 1400 is in the second state (for example, folded state), the audio DSP 240 may change the phase of the first sound wave 1441 output from the first speaker 1440 or that of the second sound wave 1451 output from the second speaker 1450. For example, the audio DSP 240 may change the phase of the first sound wave 1441 output from the first speaker 1440 or that of the second sound wave 1451 output from the second speaker 1450 such that the first sound wave 1441 and the second sound wave 1451 have the same phase. If the first sound wave 1441 and the second sound wave 1451 have the same phase, the sound waves 1441, 1451 from the first speaker 1440 and the second speaker 1450 do not counterbalance each other even when the foldable electronic device 1400 is in the second state (for example, folded state), thereby preventing reduction in the sound output of the foldable electronic device 1400.

A foldable electronic device 1400 and a method for operating the same, according to an embodiment of the disclosure, may selectively control the phase of sound waves output from multiple speakers according to the first state (for example, flat state) and the second state (for example, folded state) of the foldable electronic device, thereby preventing reduction in the sound output of the foldable electronic device 1400.

A foldable electronic device 1400 and a method for operating the same, according to an embodiment of the disclosure, may selectively apply a first tuning value 1410 and a second tuning value 1420 to multiple speakers 1440, 1450 according to the folding state (for example, folded state, flat state) of the foldable electronic device, thereby securing flat frequency characteristics in the entire output frequency band (low, middle, and high frequency bands).

Figure 17:
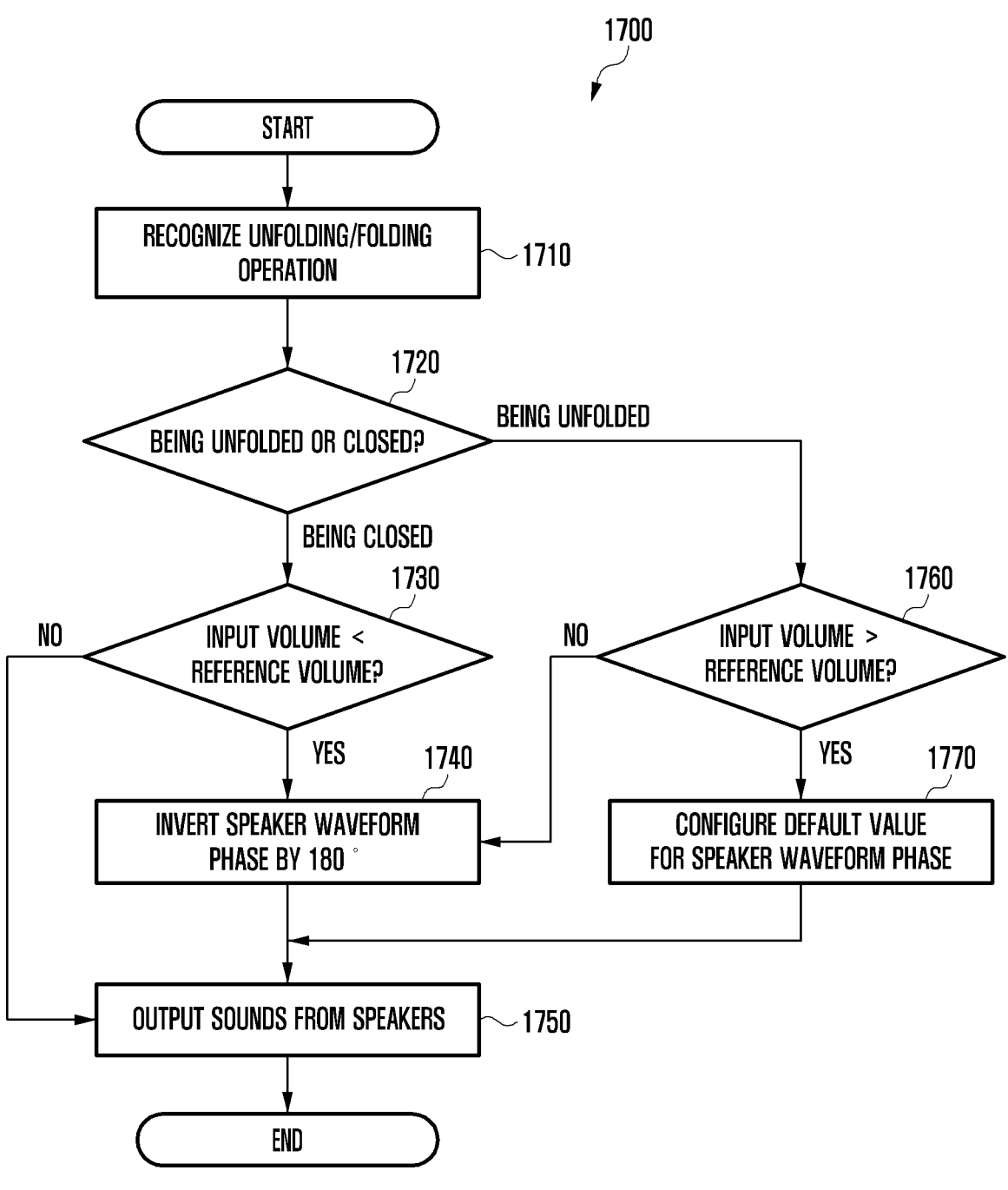
FIG. 17 illustrates a method for configuring the tuning value of multiple speakers and the phase of sound waves according to the folding angle (for example, folded angle or unfolded angle) of a foldable electronic device according to an embodiment of the disclosure.

FIG. 17 illustrates a method for configuring the tuning value of multiple speakers and the phase of sound waves according to the folding angle (for example, folded angle or unfolded angle) of a foldable electronic device according to an embodiment of the disclosure.

Referring to FIG. 17, in operation 1710, the processor (for example, processor 120 in FIG. 1, processor 220 in FIG. 2) may recognize unfolding and folding operations of the foldable electronic device (for example, foldable electronic device 700 in FIG. 7 and FIG. 8, foldable electronic device 1400 in FIG. 14, and FIG. 15).

In operation 1720, the processor 220 may determine whether the foldable electronic device 700, 1400 is in the middle of a first state (for example, flat state) or in a second state (for example, folded state). In addition, the processor 220 may determine whether the foldable electronic device 700, 1400 is in the first state (for example, flat state) or in the second state (for example, folded state).

For example, the processor 220 may determine whether the foldable electronic device 700, 1400 is in a first state (for example, flat state), based on sensing data input from a sensor module (for example, sensor module 270 in FIG. 2).

For example, the processor 220 may determine whether the foldable electronic device 700, 1400 is in a second state (for example, folded state), based on sensing data input from the sensor module 270.

For example, the processor 220 may determine whether the foldable electronic device 700, 1400 is in a third state (for example, intermediate state between flat and closed states), based on sensing data input from the sensor module 270.

For example, the processor 220 may determine whether the foldable electronic device 700, 1400 is transitioning from the first state (for example, flat state) to the second state (for example, folded state), based on sensing data input from the sensor module 270.

For example, the processor 220 may determine whether the foldable electronic device 700, 1400 is transitioning from the second state (for example, folded state) to the first state (for example, flat state), based on sensing data input from the sensor module 270.

For example, the processor 220 may determine the unfolding angle when the foldable electronic device 700, 1400 unfolds, based on sensing data input from the sensor module 270.

For example, the processor 220 may determine the folding (for example, closing) angle when the foldable electronic device 700, 1400 unfolds (for example, closes), based on sensing data input from the sensor module 270.

When it is determined in operation 1720 that the foldable electronic device 700, 1400 is being closed from the first state (for example, flat state) to the second state (for example, closed state), the processor 220 may proceed to operation 1730.

In operation 1730, the processor 220 may determine whether the magnitude of input volume detected through a voice input device (for example, voice input device 250 in FIG. 2) is smaller than the magnitude of reference volume. For example, sounds output from multiple speakers (for example, multiple speakers 740, 750, 760, 770 in FIG. 7 to FIG. 9, multiple speakers 1440, 1450 in FIG. 14 and FIG. 15) may be input to the sound input device 250, and the magnitude of input volume may be detected. The magnitude of input volume may vary depending on the folding angle (for example, unfolded angle, folded angle) of the foldable electronic device 700, 1400. The processor 220 may determine whether the foldable electronic device 700, 1400 is in the first state (for example, flat state) or in the second state (for example, closed state), based on the magnitude of input volume. For example, when the magnitude of input volume is smaller than the reference volume, the foldable electronic device 700, 1400 may be deemed in the second state (for example, closed state). For example, when the magnitude of input volume is not smaller than the reference volume, the foldable electronic device 700, 1400 may be deemed in the first state (for example, open state).

When it is determined in operation 1730 that the magnitude of input volume is smaller than the magnitude of reference volume, the processor 220 may proceed to operation 1740. For example, when the magnitude of input volume is smaller than the magnitude of reference volume, the processor 220 may determine that the foldable electronic device 700, 1400 is in the second state (for example, closed state).

In operation 1740, when the foldable electronic device 700, 1400 is in the second state (for example, folded state), the processor 220 may control the audio DSP (for example, audio DSP 240 in FIG. 2) such that the phase of sound waves from one of the first speaker (for example, first speaker 1440 in FIG. 14 and FIG. 15) and the second speaker (for example, second speaker 1450 in FIG. 14 and FIG. 15) is changed.

For example, the audio DSP 240 may invert the phase of the first sound wave (for example, first sound wave 1441 in FIG. 14 and FIG. 15) output from the first speaker (for example, first speaker 1440 in FIG. 14 and FIG. 15) by 180°. Accordingly, the phase of the first sound wave 1441 and that of the second sound wave 1451 may become identical.

For example, the audio DSP 240 may invert the phase of the second sound wave (for example, second sound wave 1451 in FIG. 14 and FIG. 15) output from the second speaker (for example, second speaker 1450 in FIG. 14 and FIG. 15) by 180°. Accordingly, the phase of the first sound wave 1441 and that of the second sound wave 1451 may become identical.

In operation 1750, sounds may be output from a speaker (for example, multiple speakers).

In operation 1740, when the first sound wave 1441 and the second sound wave 1451 have the same phase, sounds may be output from multiple speakers that output sound waves having the same phase. As the first sound wave 1441 and the second sound wave 1451 have the same phase, the sound output of the first speaker 1440 and the second speaker 1450 may be prevented from decreasing even when the foldable electronic device 700, 1400 is in the second state (for example, folded state).

When it is determined in operation 1730 that the magnitude of input volume is not smaller than the magnitude of reference volume (for example, when the magnitude of input volume is larger than the magnitude of reference volume), the processor 220 may proceed to operation 1750.

For example, when the magnitude of input volume is not smaller than the magnitude of reference volume, the foldable electronic device 700, 1400 may not be fully in the second state (for example, closed state), but unfolded by a predetermined angle. In this case, the audio DSP 240 may not change the phase of the first sound wave 1441 output from the first speaker 1440 and that of the second sound wave 1451 output from the second speaker 1450, and may configure a default value therefor such that sound waves are output accordingly.

Back to operation 1720, when it is determined in operation 1720 that the foldable electronic device 700, 1400 is being unfolded from the second state (for example, closed state) to the first state (for example, flat state), the processor 1760 may proceed to operation 1760.

In operation 1760, the processor 220 may determine whether the magnitude of input volume detected through a voice input device (for example, voice input device 250 in FIG. 2) is larger than the magnitude of reference volume. For example, sounds output from multiple speakers may be input to the sound input device 250, and the magnitude of input volume may be detected. The magnitude of input volume may vary depending on the folding angle (for example, unfolded angle, folded angle) of the foldable electronic device 700, 1400. The processor 220 may determine whether the foldable electronic device 700, 1400 is in the first state (for example, flat state) or in the second state (for example, closed state), based on the magnitude of input volume.

For example, when the magnitude of input volume is larger than the reference volume, the foldable electronic device 700, 1400 may be deemed in the first state (for example, open state). For example, when the magnitude of input volume is not larger than the reference volume, the foldable electronic device 700, 1400 may be deemed in the second state (for example, closed state).

When it is determined in operation 1760 that the magnitude of input volume is larger than the reference volume, the audio DSP 240 may proceed to operation 1770.

In operation 1770, the audio DSP 240 may not change the phase of the first sound wave 1441 output from the first speaker 1440 and that of the second sound wave 1451 output from the second speaker 1450, and may configure a default value therefor such that sound waves are output accordingly.

In operation 1750, sounds may be output from speakers.

When it is determined in operation 1760 that the magnitude of input volume is not larger than the reference volume, the audio DSP 240 may determine that the foldable electronic device 700, 1400 is in the second state (for example, closed state) and may proceed to operation 1740.

In operation 1740, the audio DSP 240 may invert the phase of the first sound wave 1441 or the second sound wave 1451 by 180° such that the first sound wave 1441 and that of the second sound wave 1451 have the same phase.

In operation 1750, sounds may be output from speakers that output sound waves having the same phase. As the first sound wave 1441 and the second sound wave 1451 have the same phase, the sound output of the first speaker 1440 and the second speaker 1450 may be prevented from decreasing even when the foldable electronic device 700, 1400 is in the second state (for example, folded state).

At least some of the operations illustrated in FIG. 17 may be omitted. At least some operations mentioned with reference to other drawings in this document may be added and/or inserted before or after at least some of the operations illustrated in FIG. 17. The operations illustrated in FIG. 17 may be performed by a processor (for example, processor 120 in FIG. 1, processor 220 in FIG. 2). For example, the memory (for example, memory 130 in FIG. 1, memory 230 in FIG. 2) of the electronic device may store instructions which cause the processor 220 to perform at least some of the operations illustrated in FIG. 17.

The foldable electronic device 700, 1400 according to various embodiments of the disclosure may detect the folding angle (for example, unfolded angle or folded angle) of the foldable electronic device 700, 1400 by using an optical sensor (for example, optical sensor 272 in FIG. 2) included in a sensor module (for example, sensor module 270 in FIG. 2).

The foldable electronic device 700, 1400 according to various embodiments of the disclosure may detect the folding angle (for example, unfolded angle or folded angle) of the foldable electronic device 700, 1400 by using a gyro/acceleration sensor (for example, gyro/acceleration sensor in FIG. 2) included in the sensor module (for example, sensor module 270 in FIG. 2).

In an embodiment, the processor 220 may determine the folding angle (for example, unfolded angle or folded angle) of the foldable electronic device 700, 1400, based on sensing data from the sensor module 270. Based on the detected folding angle (for example, unfolded angle or folded angle) of the foldable electronic device 700, 1400, the processor 220 may determine whether to apply a first tuning value (for example, first tuning value 610 in FIG. 6, first tuning value 1610 in FIG. 16) such that multiple speakers have first sound output characteristics (for example, first sound output characteristics 1601 in FIG. 16) or to apply a changed tuning value (for example, changed tuning value 620 in FIG. 6, changed tuning value 1620 in FIG. 16) such that multiple speakers have second sound output characteristics (for example, second sound output characteristics 1602 in FIG. 16).

For example, when the folding angle (for example, unfolded angle or folded angle) of the foldable electronic device 700, 1400 is equal to or larger than a preconfigured reference angle (for example, 45°), the processor 220 may determine that the foldable electronic device 700, 1400 is in a first state (for example, flat state). When the folding angle (for example, unfolded angle or folded angle) of the foldable electronic device 700, 1400 is equal to or larger than the preconfigured reference angle (for example, 45°), the audio DSP 240 may apply a first tuning value 610, 1610 to multiple speakers (for example, first speaker 740, second speaker 750, third speaker 760, fourth speaker 770 in FIG. 7 and FIG. 8), based on the control of the processor 220.

For example, when the folding angle (for example, unfolded angle or folded angle) of the foldable electronic device 700, 1400 is less than the preconfigured reference angle (for example, 45°), the processor 220 may determine that the foldable electronic device 700, 1400 is in a second state (for example, closed state). When the folding angle (for example, unfolded angle or folded angle) of the foldable electronic device 700, 1400 is less than the preconfigured reference angle (for example, 45°), the audio DSP 240 may apply a changed tuning value 620, 1620 to multiple speakers (for example, first speaker 740, second speaker 750, third speaker 760, fourth speaker 770 in FIG. 7 and FIG. 8), based on the control of the processor 220. For example, the changed tuning value 620, 1620 may include a second tuning value (for example, second tuning value 622 in FIG. 6) and a third tuning value (for example, third tuning value 624 in FIG. 6).

Figure 18:
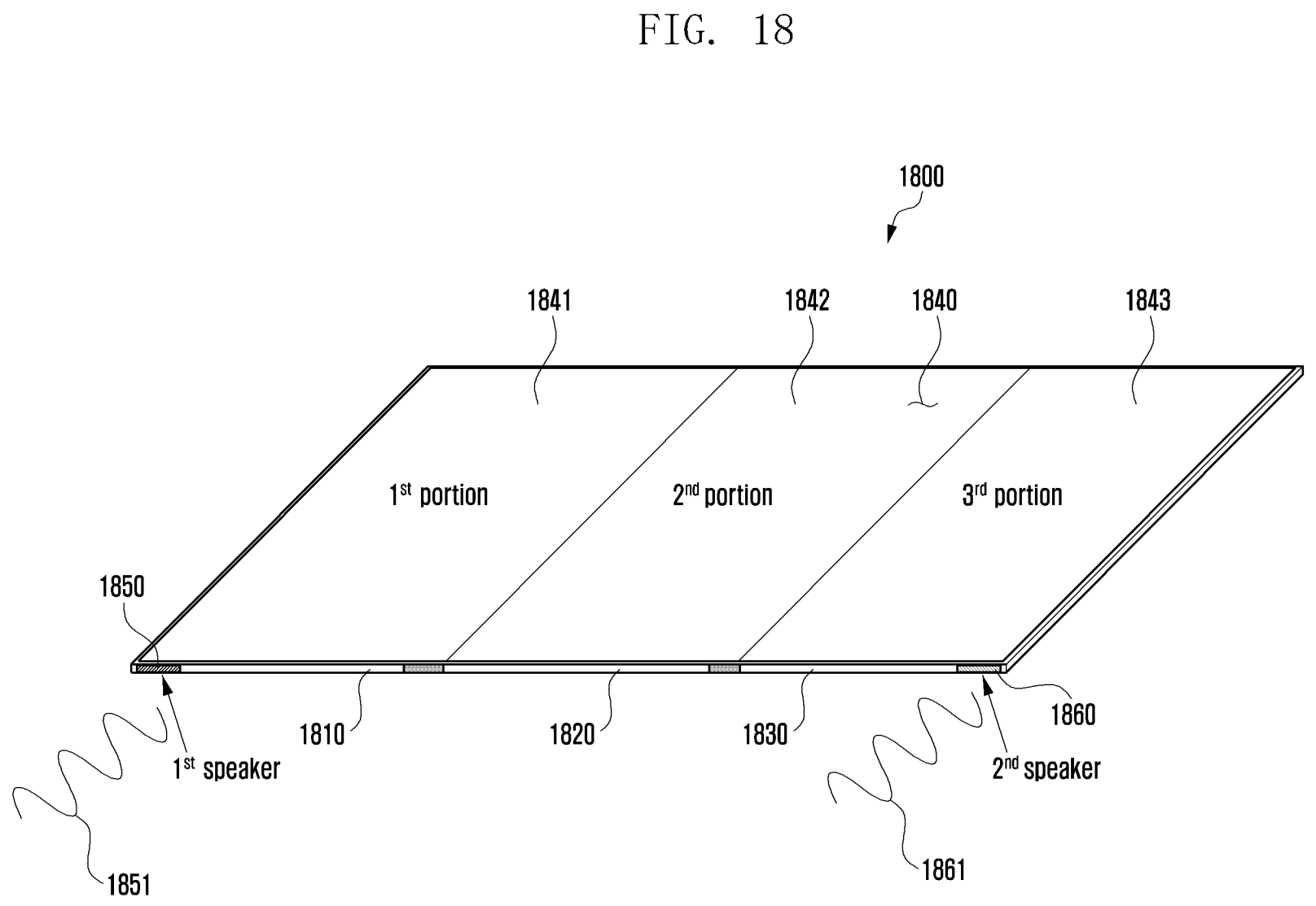
Figure 19:
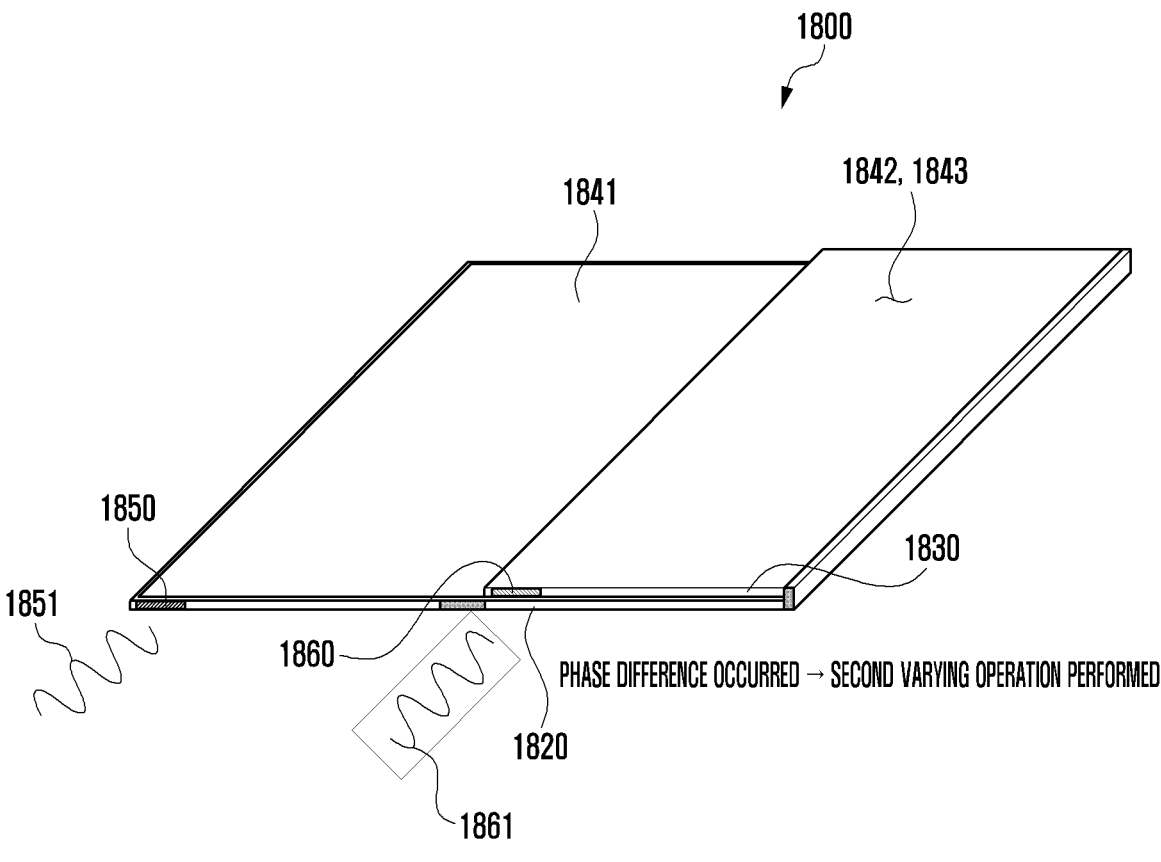
FIG. 19 illustrates a method for configuring the tuning value of multiple speakers when a multi-foldable electronic device according to an embodiment of the disclosure is folded once.
Figure 20:
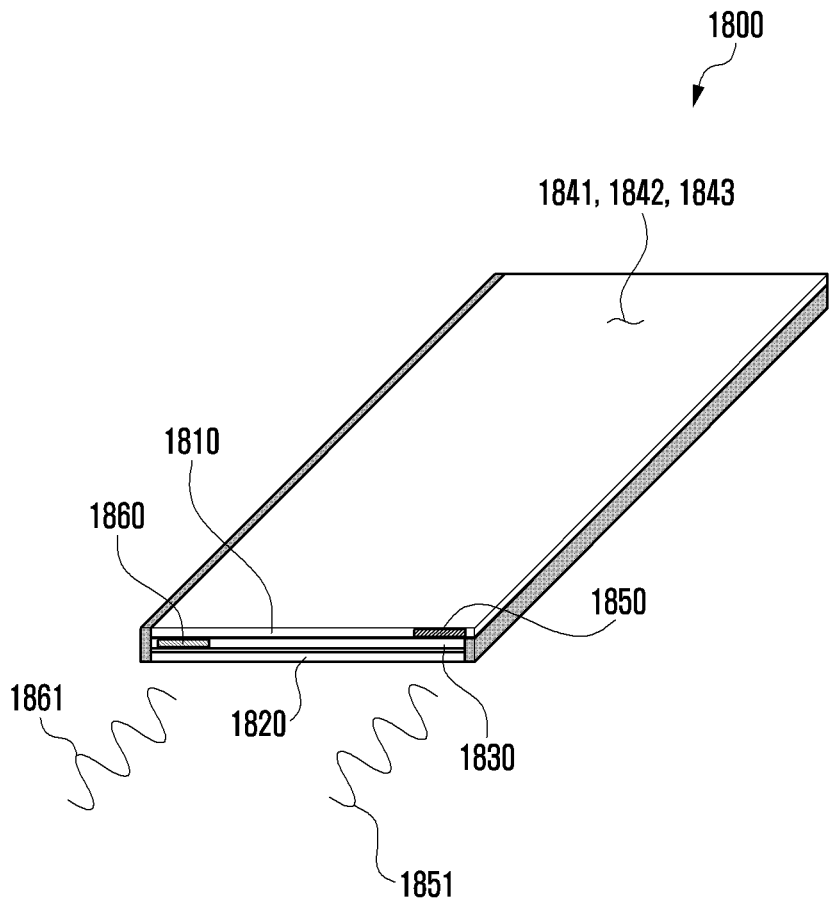
FIG. 20 illustrates a method for configuring the tuning value of multiple speakers when a multi-foldable electronic device according to an embodiment of the disclosure is folded twice.

FIG. 18 illustrates a multi-foldable electronic device according to an embodiment of the disclosure. FIG. 19 illustrates a method for configuring the tuning value of multiple speakers when a multi-foldable electronic device according to an embodiment of the disclosure is folded once. FIG. 20 illustrates a method for configuring the tuning value of multiple speakers when a multi-foldable electronic device according to an embodiment of the disclosure is folded twice.

Referring to FIG. 18 to FIG. 20, the multi-foldable electronic device 1800 according to an embodiment of the disclosure may include a housing structure including a first housing 1810, a second housing 1820, and a third housing 1830; a display 1840 disposed in an inner space provided in the housing structure; a first speaker 1850 disposed in the first housing 1810; a second speaker 1860 disposed in the third housing 1830; a first hinge unit (not illustrated) configured to connect the first housing 1810 and the second housing 1820; and a second hinge unit (not illustrated) configured to connect the second housing 1820 and the third housing 1830.

In an embodiment, the multi-foldable electronic device 1800 may be folded such that a first portion 1841 and a second portion 1842 abut each other (for example, come close). In an embodiment, the multi-foldable electronic device 1800 may be folded such that a second portion 1842 and a third portion 1843 abut each other (for example, come close).

The multi-foldable electronic device 1800 may be folded such that the second portion 1842 and the third portion 1843 abut each other (for example, come close), and may then be folded such that the first portion 1841 and the third portion 1843 abut each other (for example, come close).

In an embodiment, the first speaker 1850 may output a first sound wave 1851, and the second speaker 1860 may output a second sound wave 1861.

For example, in a first state in which the first portion 1841, the second portion 1842, and the third portion 1843 of the multi-foldable electronic device 1800 are all unfolded, the first sound wave 1851 output from the first speaker 1850 and the second sound wave 1861 output from the second speaker 1860 may have the same phase.

For example, when the multi-foldable electronic device 1800 is folded such that the second portion 1842 and the third portion 1843 abut each other (for example, come close), the first sound wave 1851 output from the first speaker 1850 and the second sound wave 1861 output from the second speaker 1860 have a phase difference of 180°, and the first sound wave 1851 and the second sound wave 1861 may thus counterbalance each other.

For example, the audio DSP (for example, audio DSP in FIG. 2) may change (for example, change by 180°) the phase of the first sound wave 1851 or that of the second sound wave 1861 such that the first sound wave 1851 and the second sound wave 1861 have the same phase when the second portion 1842 and the third portion 1843 of the multi-foldable electronic device 1800 are folded to abut each other (for example, come close), based on the control of the processor (for example, processor 240 in FIG. 2). As first sound wave 1851 and the second sound wave 1861 have the same phase, the sound output of the first speaker 1850 and the second speaker 1860 may be prevented from decreasing when the multi-foldable electronic device 1800 is partially folded.

In an embodiment, for example, when the second portion 1842 and the third portion 1843 of the multi-foldable electronic device 1800 are folded to abut each other (for example, come close), the first portion 1841 and the third portion 1843 may be folded to abut each other (for example, come close).

For example, when the first portion 1841, the second portion 1842, and the third portion 1843 of the multi-foldable electronic device 1800 are folded to overlap, the audio DSP (for example, audio DSP 240 in FIG. 2) may configure a default value for the phase of the first sound wave 1851 and the second sound wave 1861, based on the control of the processor (for example, processor 240 in FIG. 2). When a default value is configured for the phase of the first sound wave 1851 and the second sound wave 1861, the first sound wave 1851 and the second sound wave 1861 may have the same phase.

For example, when the first portion 1841, the second portion 1842, and the third portion 1843 of the multi-foldable electronic device 1800 are folded to overlap, audio DSP (for example, audio DSP 240 in FIG. 2) may change (for example, change by 180°) the phase of the first sound wave 1851 or that of the second sound wave 1861 such that the first sound wave 1851 and the second sound wave 1861 have the same phase, based on the control of the processor (for example, processor 240 in FIG. 2). As first sound wave 1851 and the second sound wave 1861 have the same phase, the sound output of the first speaker 1850 and the second speaker 1860 may be prevented from decreasing when the multi-foldable electronic device 1800 is partially folded.

A foldable electronic device (for example, electronic device 200 in FIG. 2, electronic device 300 in FIG. 3, foldable electronic device 700 in FIG. 7 and FIG. 8, electronic device 1400 in FIG. 14 and FIG. 15) according to an embodiment of the disclosure is a foldable electronic device 200, 300, 700, 1400 including multiple speakers (for example, multiple speakers 740, 750, 760, 770 in FIG. 7 and FIG. 8). The foldable electronic device 200, 300, 700, 1400 may include: a first housing (for example, first housing 710 in FIG. 7 and FIG. 8); a second housing (for example, second housing 720 in FIG. 7 and FIG. 8) foldably coupled to the first housing 710 through a hinge (for example, hinge unit 430 in FIG. 4 and FIG. 5, hinge unit 1430 in FIG. 14 and FIG. 15); a flexible display (for example, flexible display 730 in FIG. 7 and FIG. 8) configured to extend from one surface of the first housing 710 to one surface of the second housing 720 and disposed to be supported by the first housing 710 and the second housing 720; multiple speakers 740, 750, 760, 770 disposed in the first housing 710 and the second housing 720; a processor (for example, processor 120 in FIG. 1, processor 220 in FIG. 2) configured to operate the multiple speakers 740, 750, 760, 770; and a memory (for example, memory 130 in FIG. 1, memory 230 in FIG. 2) operatively connected to the processor 120, 220. The memory 130, 230 may include instructions which enable the processor 120, 220, when executed, to determine a first state (for example, flat state) in which the first housing 710 and the second housing 720 are unfolded or a second state (for example, folded state) in which the first housing 710 and the second housing 720 are folded to face each other. The memory 130, 230 may include instructions which enable the processor 120, 220, when executed, to control the multiple speakers 740, 750, 760, 770 to have first sound output characteristics in the first state (for example, flat state). The memory 130, 230 may include instructions which enable the processor 120, 220, when executed, to control the multiple speakers 740, 750, 760, 770 to have second sound output characteristics in the second state (for example, folded state).

A foldable electronic device including multiple speakers and a method for operating the same, according to an embodiment of the disclosure, may selectively control sound output characteristics of the multiple speakers 740, 750, 760, 770; 1440, 1450 according to the folding state (for example, folded state, flat state) of the foldable electronic device 700, 1400, thereby ensuring flat frequency response characteristics in the entire output frequency band.

According to an embodiment, the processor 120, 220, when executed, may apply a first tuning value (for example, first tuning value 610 in FIG. 6, first tuning value 1610 in FIG. 16) to the multiple speakers 740, 750, 760, 770 such that the multiple speakers 740, 750, 760, 770 output sound waves in the entire output frequency band in the first state (for example, flat state).

According to an embodiment, the processor 120, 220, when executed, may configure a stereo output direction (for example, stereo channel) of the multiple speakers 740, 750, 760, 770.

According to an embodiment, in the second state, a third tuning value different from the second tuning value is applied to remaining speakers other than the specific speakers such that remaining speakers other than the specific speakers output a sound wave in a second frequency band different from the first frequency band among the entire output frequency band.

According to an embodiment, the processor 120, 220, when executed, may apply a second tuning value (for example, changed tuning value 620 in FIG. 6, changed tuning value 1620 in FIG. 16) to specific speakers among the multiple speakers 740, 750, 760, 770 so as to output a sound wave in a first frequency band among the entire output frequency band in the second state (for example, folded state).

According to an embodiment, in the second state (for example, folded state), a second tuning value 620, 1620 may be applied to specific speakers among the multiple speakers 740, 750, 760, 770 so as to output a sound wave in a second frequency band lower than the first frequency band.

According to an embodiment, the processor 120, 220, when executed, may configure a stereo output direction (for example, stereo channel) of the multiple speakers 740, 750, 760, 770.

According to an embodiment, the multiple speakers 740, 750, 760, 770 may include a first speaker 740 and a second speaker 750 disposed on a first portion with reference to a folding axis around which the flexible display 730 is folded, and a third speaker 760 and a fourth speaker 770 disposed on a second portion with reference to the folding axis.

According to an embodiment, the processor 120, 220, when executed, may apply a first tuning value 610, 1610 to the first speaker 740 to the fourth speaker 770 so as to output sound waves in the entire output frequency band in the first state (for example, flat state).

According to an embodiment, in the second state, the first speaker 740 and the third speaker 760 may be positioned adjacent to each other, and the second speaker 750 and the fourth speaker 770 may be positioned adjacent to each other.

According to an embodiment, in the second state, the first speaker 740 and the third speaker 760 may be positioned to face in an identical direction, and the second speaker 750 and the fourth speaker 770 may be positioned to face in an identical direction.

According to an embodiment, the processor 120, 220, when executed, may configure a stereo channel such that the first speaker 740 and the second speaker 750 output sound waves in a first direction.

According to an embodiment, the processor 120, 220, when executed, may configure a stereo channel such that the third speaker 760 and the fourth speaker 770 output sound waves in a second direction.

According to an embodiment, the processor 120, 220, when executed, may apply a second tuning value (for example, second tuning value 622 (for example, high-frequency band tuning value) of changed tuning value 620 in FIG. 6) to the first speaker 740 and the second speaker 750 so as to output a sound wave in a first frequency band among the entire output frequency band in the second state (for example, folded state).

According to an embodiment, the processor 120, 220, when executed, may apply a third tuning value (for example, third tuning value 624 (for example, middle/low-frequency band tuning value) of changed tuning value 620 in FIG. 6) to the third speaker 760 and the fourth speaker 770 so as to output a sound wave in a second frequency band lower than the first frequency band in the second state (for example, folded state).

According to an embodiment, the processor 120, 220, when executed, may configure a stereo channel such that the first speaker 740 and the third speaker 760 output sound waves in a first direction.

According to an embodiment, the processor 120, 220, when executed, may configure a stereo channel such that the second speaker 750 and the fourth speaker 770 output sound waves in a second direction.

A foldable electronic device including multiple speakers and a method for operating the same, according to an embodiment of the disclosure, may selectively apply a first tuning value 610 and a changed tuning value 620 to multiple speakers 740, 750, 760, 770 according to the folding state (for example, folded state, flat state) of the foldable electronic device, thereby ensuring flat frequency response characteristics in the entire output frequency band (low, middle, and high frequency bands).

A foldable electronic device including multiple speakers and a method for operating the same, according to an embodiment of the disclosure, may output sounds at the maximum output of the multiple speakers 740, 750, 760, 770 regardless of the first state (for example, flat state) and the second state (for example, folded state) of the foldable electronic device.

A foldable electronic device 200, 300, 700, 1400 according to an embodiment of the disclosure is a foldable electronic device 200, 300, 700, 1400 including multiple speakers 740, 750, 760, 770. The foldable electronic device 200, 300, 700, 1400 may include: a first housing (for example, first housing 710 in FIG. 7 and FIG. 8); a second housing (for example, second housing 720 in FIG. 7 and FIG. 8) foldably coupled to the first housing 710 through a hinge (for example, hinge unit 430 in FIG. 4 and FIG. 5, hinge unit 1430 in FIG. 14 and FIG. 15); a flexible display (for example, flexible display 730 in FIG. 7 and FIG. 8) configured to extend from one surface of the first housing 710 to one surface of the second housing 720 and disposed to be supported by the first housing 710 and the second housing 720; multiple speakers 740, 750, 760, 770 disposed in the first housing 710 and the second housing 720; a processor 120, 220 configured to operate the multiple speakers 740, 750, 760, 770; and a memory 130, 230 operatively connected to the processor 120, 220. The memory 130, 230 may include instructions which enable the processor 120, 220, when executed, to determine a first state (for example, flat state) in which the first housing 710 and the second housing 720 are unfolded or a second state (for example, folded state) in which the first housing 710 and the second housing 720 are folded to face each other. The memory 130, 230 may include instructions which enable the processor 120, 220, when executed, to control the multiple speakers 740, 750, 760, 770 to output sound waves without a phase change in response to a sound source in the first state (for example, flat state). The memory 130, 230 may include instructions which enable the processor 120, 220, when executed, to control a sound wave among the sound waves output from the multiple speakers 740, 750, 760, 770 in response to the sound source so as to be output after a phase change in the second state (for example, folded state).

According to an embodiment, the processor 120, 220, when executed, may cause the multiple speakers 740, 750, 760, 770 to output sound waves with an identical phase in the first state (for example, flat state).

According to an embodiment, the processor 120, 220, when executed, may apply a first tuning value 610, 1610 to the multiple speakers 740, 750, 760, 770 such that the multiple speakers 740, 750, 760, 770 output sound waves in the entire output frequency band in the first state (for example, flat state).

According to an embodiment, the processor 120, 220, when executed, may cause one of the multiple speakers 740, 750, 760, 770 to output a sound wave after a 180° phase change such that sound waves output from the multiple speakers 740, 750, 760, 770 have an identical phase in the second state (for example, folded state).

According to an embodiment, the processor 120, 220, when executed, may apply a second tuning value 620, 1620 to specific speakers among the multiple speakers 740, 750, 760, 770 so as to output a sound wave in a first frequency band among the entire output frequency band in the second state (for example, folded state).

According to an embodiment, the processor 120, 220, when executed, may apply a second tuning value 620, 1620 to specific speakers among the multiple speakers 740, 750, 760, 770 so as to output a sound wave in a second frequency band different from the first frequency band in the second state (for example, folded state).

A foldable electronic device (for example, electronic device 200 in FIG. 2, electronic device 300 in FIG. 3, foldable electronic device 700 in FIG. 7 and FIG. 8, electronic device 1400 in FIG. 14 and FIG. 15) according to an embodiment of the disclosure may include a first housing, a second housing foldably coupled to the first housing through a hinge, a flexible display disposed to be supported by the first housing and the second housing, multiple speakers including a first speaker disposed in the first housing and a second speaker disposed in the second housing, a processor, and a memory operatively connected to the processor. The memory may include instructions. When the instructions are executed by the processor, the electronic device may determine a first state in which the first housing and the second housing are unfolded or a second state in which the first housing and the second housing are folded to face each other. When the instructions are executed by the processor, the electronic device may control sound output frequency characteristics of the first speaker and the second speaker so as to have first sound output frequency characteristics, based on that the electronic device is in the first state. When the instructions are executed by the processor, the electronic device may control sound output frequency characteristics of the first speaker so as to have second sound output frequency characteristics different from the first sound output frequency characteristics, based on that the electronic device is in the second state. When the instructions are executed by the processor, the electronic device may control sound output frequency characteristics of the second speaker so as to have third sound output frequency characteristics different from the second sound output frequency characteristics, based on that the electronic device is in the second state.

According to an embodiment, in case that the electronic device is in the first state, a first setting value may be applied to the first speaker and the second speaker so as to output sounds in an entire frequency band which the multiple speakers can substantially output.

According to an embodiment, in case that the electronic device is in the second state, different setting values may be applied to the first speaker and the second speaker so as to output sounds in a partial frequency band among an entire frequency band which the multiple speakers can substantially output.

According to an embodiment, in case that the electronic device is in the second state, a second setting value may be applied to the first speaker so as to output sounds in a frequency band of a first part among an entire frequency band which the multiple speakers can substantially output. In case that the electronic device is in the second state, a third setting value may be applied to the second speaker so as to output sounds in a frequency band of a second part among the entire frequency band which the multiple speakers can substantially output.

According to an embodiment, the multiple speakers may further include a third speaker disposed in the first housing and a fourth speaker disposed in the second housing. The first speaker may be disposed in a first area of the first housing. The second speaker may be disposed in a first area of the second housing. The third speaker may be disposed in a second area of the first housing. The fourth speaker may be disposed in a second area of the second housing.

According to an embodiment, in case that the electronic device is in the first state, the first setting value may be applied to the first speaker to the fourth speaker so as to output sounds in an entire frequency band which the multiple speakers can substantially output.

According to an embodiment, in case that the electronic device is in the second state, a second setting value may be applied to the first speaker and the third speaker so as to output sounds in a frequency band of a first part among an entire frequency band which the multiple speakers can substantially output. In case that the electronic device is in the second state, a third setting value may be applied to the second speaker so as to output sounds in a partial frequency band of a second part among the entire frequency band which the multiple speakers can substantially output.

According to an embodiment, in the second state of the electronic device, the first speaker and the second speaker may be positioned adjacent to each other. In the second state of the electronic device, the third speaker and the fourth speaker may be positioned adjacent to each other.

According to an embodiment, in case that the electronic device is in the first state, a first stereo output channel may be configured for the first speaker and the third speaker such that first speaker and the third speaker output a first side sound among stereo sounds. In case that the electronic device is in the first state, a second stereo output channel may be configured for the second speaker and the fourth speaker such that second speaker and the fourth speaker output a second side sound among stereo sounds.

According to an embodiment, in case that the electronic device is in the second state, a first stereo output channel may be configured for the first speaker and the second speaker such that first speaker and the second speaker output a first side sound among stereo sounds. In case that the electronic device is in the second state, a second stereo output channel may be configured for the third speaker and the fourth speaker such that third speaker and the fourth speaker output a second side sound among stereo sounds.

A foldable electronic device (for example, electronic device 200 in FIG. 2, electronic device 300 in FIG. 3, foldable electronic device 700 in FIG. 7 and FIG. 8, electronic device 1400 in FIG. 14 and FIG. 15) according to an embodiment of the disclosure may include a first housing, a second housing foldably coupled to the first housing through a hinge, a flexible display disposed to be supported by the first housing and the second housing, multiple speakers including a first speaker disposed in the first housing and a second speaker disposed in the second housing, a processor, and a memory operatively connected to the processor. The memory may include instructions. When the instructions are executed by the processor, the electronic device may determine a first state in which the first housing and the second housing are unfolded or a second state in which the first housing and the second housing are folded to face each other. When the instructions are executed by the processor, the electronic device may control sound output characteristics of the multiple speakers such that sounds are output from the multiple speakers without a phase change, based on that the electronic device is in the first state. When the instructions are executed by the processor, the electronic device may control sound output characteristics of the multiple speakers such that the phase of sounds output from at least one speaker among the multiple speakers is changed, based on that the electronic device is in the second state.

According to an embodiment, in case that the electronic device is in the first state, a first setting value may be applied to the first speaker and the second speaker such that sounds output from the first speaker and the second speaker have an identical phase.

According to an embodiment, in case that the electronic device is in the second state, a first setting value may be applied to the first speaker such that sounds output from the first speaker have a first phase. In case that the electronic device is in the second state, a second setting value may be applied to the second speaker such that sounds output from the second speaker have a second phase having a 180° phase difference from the first phase.

According to an embodiment, the multiple speakers may further include a third speaker disposed in the first housing and a fourth speaker disposed in the second housing. The first speaker may be disposed in a first area of the first housing. The second speaker may be disposed in a first area of the second housing. The third speaker may be disposed in a second area of the first housing. The fourth speaker may be disposed in a second area of the second housing.

According to an embodiment, in case that the electronic device is in the first state, a first setting value may be applied to the first speaker to the fourth speaker such that sounds output from the first speaker to the fourth speaker have an identical phase.

According to an embodiment, in case that the electronic device is in the second state, a first setting value may be applied to the first speaker and the third speaker such that sounds output from the first speaker and the third speaker have a first phase. In case that the electronic device is in the second state, a second setting value may be applied to the second speaker and the fourth speaker such that sounds output from the second speaker and the fourth speaker have a second phase having a 180° phase difference from the first phase.

According to an embodiment, in the second state of the electronic device, the first speaker and the second speaker may be positioned adjacent to each other. In the second state of the electronic device, the third speaker and the fourth speaker may be positioned adjacent to each other.

A foldable electronic device (for example, electronic device 200 in FIG. 2, electronic device 300 in FIG. 3, foldable electronic device 700 in FIG. 7 and FIG. 8, electronic device 1400 in FIG. 14 and FIG. 15) according to an embodiment of the disclosure may include a first housing, a second housing foldably coupled to the first housing through a hinge, a flexible display disposed to be supported by the first housing and the second housing, multiple speakers including a first speaker disposed in the first housing and a second speaker disposed in the second housing, a processor, and a memory operatively connected to the processor. The memory may include instructions. When the instructions are executed by the processor, the electronic device may determine a first state in which the first housing and the second housing are unfolded or a second state in which the first housing and the second housing are folded to face each other. When the instructions are executed by the processor, the electronic device may control sound output frequency characteristics applied to the multiple speakers so as to have substantially flat frequency output characteristics in an entire frequency band which the multiple speakers can output, regardless of whether the first state or the second state of the electronic device.

According to an embodiment, based on that the electronic device is in the first state, a first sound output frequency characteristic value may be applied to the first speaker and the second speaker so as to output sounds in an entire frequency band which the first speaker and the second speaker can substantially output.

According to an embodiment, based on that the electronic device is in the second state, a second sound output frequency characteristic value may be applied to the first speaker so as to output sounds in a frequency band of a first part of an entire frequency band which the multiple speakers can substantially output. Based on that the electronic device is in the second state, a third sound output frequency characteristic value may be applied to the second speaker so as to output sounds in a frequency band of a second part of the entire frequency band which the multiple speakers can substantially output.

A foldable electronic device and a method for operating the same, according to an embodiment of the disclosure, may selectively control the phase of sound waves output from the multiple speakers according to the first state (for example, flat state) and the second state (for example, folded state) of the foldable electronic device, thereby preventing the sound output from decreasing.

The invention claimed is:

1. A foldable electronic device comprising:
   a first housing;
   a second housing coupled to the first housing through a hinge;
   a flexible display disposed to be supported by the first housing and the second housing;

multiple speakers comprising a first speaker disposed in the first housing and a second speaker disposed in the second housing;

a processor; and a memory operatively connected to the processor, wherein the memory comprises instructions, and wherein, when the instructions are executed by the processor, the electronic device is configured to:

determine a first state in which the first housing and the second housing are unfolded or a second state in which the first housing and the second housing are folded to face each other;

control sound output frequency characteristics of the first speaker and the second speaker to be first sound output frequency characteristics, based on that the electronic device is in the first state; and control sound output frequency characteristics of the first speaker to be second sound output frequency characteristics different from the first sound output frequency characteristics, based on that the electronic device is in the second state, wherein the multiple speakers comprise a third speaker disposed in the first housing and a fourth speaker disposed in the second housing, the first speaker is disposed in a first area of the first housing, the second speaker is disposed in a first area of the second housing, the third speaker is disposed in a second area of the first housing, and the fourth speaker is disposed in a second area of the second housing, in case that the electronic device is in the first state, a first stereo output channel is configured for the first speaker and the third speaker such that first speaker and the third speaker output a first side sound among stereo sounds, and a second stereo output channel is configured for the second speaker and the fourth speaker such that second speaker and the fourth speaker output a second side sound among stereo sounds.

2. The foldable electronic device of claim 1, wherein, in case that the electronic device is in the first state, a first setting value is applied to the first speaker and the second speaker to output sounds in an entire frequency band which the multiple speakers can substantially output.

3. The foldable electronic device of claim 1, wherein, in case that the electronic device is in the second state, different setting values are applied to the first speaker and the second speaker to output sounds in a partial frequency band among an entire frequency band which the multiple speakers can substantially output.

4. The foldable electronic device of claim 3, wherein, in case that the electronic device is in the second state, a second setting value is applied to the first speaker to output sounds in a frequency band of a first part among an entire frequency band which the multiple speakers can substantially output, and a third setting value is applied to the second speaker to output sounds in a frequency band of a second part among the entire frequency band which the multiple speakers can substantially output.

5. The foldable electronic device of claim 1, wherein in case that the electronic device is in the first state, the first setting value is applied to the first speaker to the fourth speaker to output sounds in an entire frequency band which the multiple speakers can substantially output.

6. The foldable electronic device of claim 1, wherein, in case that the electronic device is in the second state, a second setting value is applied to the first speaker and the third speaker to output sounds in a frequency band of a first part among an entire frequency band which the multiple speakers can substantially output, and a third setting value is applied to the second speaker to output sounds in a partial frequency band of a second part among the entire frequency band which the multiple speakers can substantially output.

7. The foldable electronic device of claim 1, wherein, in the second state of the electronic device, the first speaker and the second speaker are positioned adjacent to each other, and the third speaker and the fourth speaker are positioned adjacent to each other.

8. A foldable electronic device comprising:

a first housing;

a second housing coupled to the first housing through a hinge;

a flexible display disposed to be supported by the first housing and the second housing;

multiple speakers comprising a first speaker disposed in the first housing and a second speaker disposed in the second housing;

a processor; and a memory operatively connected to the processor, wherein the memory comprises instructions, and wherein, when the instructions are executed by the processor, the electronic device is configured to:

determine a first state in which the first housing and the second housing are unfolded or a second state in which the first housing and the second housing are folded to face each other;

control sound output frequency characteristics of the first speaker and the second speaker to be first sound output frequency characteristics, based on that the electronic device is in the first state; and control sound output frequency characteristics of the first speaker to be second sound output frequency characteristics different from the first sound output frequency characteristics, based on that the electronic device is in the second state, wherein:

the multiple speakers comprise a third speaker disposed in the first housing and a fourth speaker disposed in the second housing, the first speaker is disposed in a first area of the first housing, the second speaker is disposed in a first area of the second housing, the third speaker is disposed in a second area of the first housing, and the fourth speaker is disposed in a second area of the second housing, and, in case the electronic device is in the second state, a first stereo output channel is configured for the first speaker and the second speaker such that first speaker and the second speaker output a first side sound among stereo sounds, and a second stereo output channel is configured for the third speaker and the fourth speaker such that third speaker and the fourth speaker output a second side sound among stereo sounds.

* * * * *